US012775662B2

(12) United States Patent
Xu et al.

(10) Patent No.: US 12,775,662 B2
(45) Date of Patent: Oct. 27, 2026

(54) SYSTEMS AND METHODS FOR EFFICIENT VIDEO STORAGE AND RETRIEVAL VIA REVERSE RETRIEVAL-AUGMENTED GENERATION

(71) Applicant: Adeia Imaging LLC, San Jose, CA (US)

(72) Inventors: Ning Xu, Irvine, CA (US); Zhiyun Li, Kenmore, WA (US); Jean-Yves Couleaud, Mission Viejo, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/990,956

(22) Filed: Dec. 20, 2024

(65) Prior Publication Data

US 2026/0178660 A1 Jun. 25, 2026

(51) Int. Cl.

| | |
|---|---|
| ***G06F 16/732*** | (2019.01) |
| ***G06F 16/71*** | (2019.01) |
| ***G06F 16/738*** | (2019.01) |
| ***G06V 10/25*** | (2022.01) |
| ***G06V 10/82*** | (2022.01) |
| ***G06V 20/40*** | (2022.01) |
| ***G06V 20/52*** | (2022.01) |
| ***G06V 20/70*** | (2022.01) |

(52) U.S. Cl.

CPC ............ *G06F 16/732* (2019.01); *G06F 16/71* (2019.01); *G06F 16/738* (2019.01); *G06V 10/25* (2022.01); *G06V 10/82* (2022.01); *G06V 20/46* (2022.01); *G06V 20/52* (2022.01); *G06V 20/70* (2022.01)

(58) Field of Classification Search

None

See application file for complete search history.

(56) References Cited

U.S. PATENT DOCUMENTS

| | | | | |
|---|---|---|---|---|
| 12,482,498 | B1 * | 11/2025 | Samal | G06F 40/35 |
| 12,518,560 | B1 * | 1/2026 | Gupta | G06V 40/169 |
| 2015/0153906 | A1 * | 6/2015 | Liao | G06F 16/7837 715/709 |
| 2020/0312368 | A1 * | 10/2020 | Waterman | G11B 27/031 |
| 2021/0142097 | A1 * | 5/2021 | Zheng | G06N 3/0464 |
| 2023/0040513 | A1 * | 2/2023 | Ryan | G06V 10/25 |
| 2023/0306056 | A1 * | 9/2023 | Lee | G06V 20/49 |
| 2024/0370493 | A1 * | 11/2024 | Lee | G06F 16/783 |

(Continued)

OTHER PUBLICATIONS

"Google Glass Year in Review", TechCrunch, available online at <https://techcrunch.com/2013/05/19/google-glass-year-in-review/>, Dec. 30, 2024, pp. 1-15.

(Continued)

*Primary Examiner* — Richard L Bowen
(74) *Attorney, Agent, or Firm* — HG LAW LLP

(57) ABSTRACT

Systems and methods are provided for selectively storing and retrieving video data by converting video segments into textual descriptions associated with key visual features and incrementally building a vector database of feature embeddings. The feature embeddings can be used in combination with text-to-video generation models to reconstruct video segments on demand. Selective storage of feature embeddings enables optimized, accurate, and contextually relevant text-to-text and text-to-video generation and video searching functionalities.

20 Claims, 14 Drawing Sheets

(56) References Cited

U.S. PATENT DOCUMENTS

| | | | | |
|---|---|---|---|---|
| 2024/0371164 A1* | 11/2024 | Yan | ........................ | G06V 10/82 |
| 2025/0322850 A1* | 10/2025 | Shin | ........................ | G11B 27/34 |
| 2026/0064772 A1* | 3/2026 | Gupte | ................... | G06F 16/739 |
| 2026/0087757 A1* | 3/2026 | Perel | ....................... | G06T 13/40 |

OTHER PUBLICATIONS

"Kling AI—China's text-to-video generation model", Sora AI, available online at <https://web.archive.org/web/20240610215355/https://sora-ai-video.com/kling-ai>, retrieved on Dec. 30, 2024, pp. 1-6.
Amazon Web Services. "What is Cloud Storage?" Amazon.com, Inc., available online at <https://aws.amazon.com/what-is/cloud-storage/>, Dec. 30, 2024, pp. 1-10.
Bie, F. et al., "RenAIssance: A Survey into AI Text-to-Image Generation in the Era of Large Model", 2309.00810v1, Sep. 2, 2023, pp. 1-25.
Chen, W. et al., "Re-imagen: Retrieval-augmented text-to-image generator", arXiv:2209.14491, Nov. 22, 2022, pp. 1-25.
Cisco Systems, Inc. "Cisco Visual Networking Index: Forecast and Trends, 2017-2022." Cisco, 2018, available online at <https://cloud.report/Resources/Whitepapers/eea79d9b-9fe3-4018-86c6-3d1df813d3b8_white-paper-c11-741490.pdf>, retrieved on Dec. 30, 2024, 38 pages.
Goodfellow, I. J. et al., "Generative adversarial nets", Advances in Neural Information Processing Systems, vol. 27, Dec. 8, 2014, pp. 2672-2680.
GoPro. "About Us." GoPro, Inc., available online at <https://gopro.com/en/us/>, retrieved on Dec. 30, 2024, pp. 1-5.
He, Y. et al., "Animate-a-story: Storytelling with retrieval-augmented video generation", arXiv:2307.06940, Jul. 13, 2023, pp. 1-9.
Izacard, G. et al., "Leveraging Passage Retrieval with Generative Models for Open Domain Question Answering", arXiv:2007.01282, Feb. 3, 2021, 6 pages.
Lewis, P. et al., "Retrieval-Augmented Generation for Knowledge-Intensive NLP Tasks", arXiv:2005.11401, Apr. 12, 2021, pp. 1-19.
OpenAI. "Introducing Sora: The Future of Text-to-Video Generation." OpenAI Blog, OpenAI, available online at <https://openai.com/index/sora/>, Dec. 30, 2024, pp. 1-11.
Petroni, F. et al., "KILT: a benchmark for knowledge intensive language tasks", arXiv:2009.02252, May 27, 2021, 22 pages.
Qiao, T. et al., "Learn, imagine and create: Text-to-image generation from prior knowledge", Proceedings of the 33rd International Conference on Neural Information Processing Systems, Dec. 8, 2019, pp. 887-897.
Sullivan, G. J. et al., "Overview of the High Efficiency Video Coding (HEVC) Standard", IEEE Transactions on Circuits and Systems for Video Technology, vol. 22, No. 12, Dec. 2012, pp. 1649-1668.
Zhag, C. et al., "Content Based Deep Learning Image Retrieval: A Survey", Proceedings of the 2023 9th International Conference on Communication and Information Processing, Dec. 14-16, 2023, pp. 158-163.

* cited by examiner

SYSTEMS AND METHODS FOR EFFICIENT VIDEO STORAGE AND RETRIEVAL VIA REVERSE RETRIEVAL-AUGMENTED GENERATION

BACKGROUND

This disclosure is related to efficient storage and retrieval of video data.

SUMMARY

Continuous video recordings (e.g., surveillance footage, continuous life recording) present a particular challenge to existing technologies related to data storage and retrieval. In one approach, every frame of a continuous video recording is stored, resulting in tremendously large file sizes. In another approach, video compression techniques are used to reduce file sizes while reducing quality loss. However, even with advanced compression algorithms, the storage requirements for continuous video recording remain a formidable challenge. In another approach, segments of continuous video recordings are only stored when a motion sensor is triggered. However, this approach also results in large file sizes due to unwanted motion sensor triggering by, for example, distant automobiles and wildlife. Furthermore, this approach does not effectively aid in reducing file sizes for continuous life recording scenarios. In another approach, compression is applied to video recordings on a frame-by-frame basis, which fails to mitigate excess stored information present on an inter frame basis (e.g., repeatedly storing static background imagery). Accessing desired video recording data with existing technologies, such as those referenced above, presents significant challenges. For example, accessing a specific segment of surveillance footage in which a package was delivered may require watching hours of recorded video.

To help address these problems, methods and systems are disclosed for efficient video storage and retrieval via reverse Retrieval-Augmented Generation (RAG). In some embodiments, a system comprises a data processing application that converts video segments into feature embedding data structures comprising generated textual descriptions and associated visual features. The feature embeddings may comprise, for example, generated textual descriptions and/or links to generated textual descriptions that may be stored in another database. The data processing application may selectively add the feature embedding data structures to a vector database. The data processing application may utilize the vector database and/or textual descriptions in combination with other models to enable text-to-video generation, video searching functionality, and retrieval of relevant descriptions, generated videos, and/or stored video segments.

In some embodiments, the data processing application decides whether to modify the vector database based on a determination of whether the modification results in sufficiently improved reconstruction of at least one video segment. The modification may include adding a new feature embedding data structure to the vector database, modifying at least one stored feature embedding data structure(s), and/or removing a stored feature embedding data structure from the vector database. The determination of whether to make a modification to the vector database, and/or which modification to make, may depend on determining whether inputting at least a part of a modified version of the vector database to a video generation model, wherein the modification is based on a particular feature embedding data structure, results in sufficiently improved reconstruction of a received video segment, scene, object within a video segment or scene, or any combination thereof compared to inputting at least a part of an unmodified version of the vector database to the video generation model.

By only adding feature embeddings to the vector database that sufficiently improve reconstruction of video segments, these methods and systems enable efficient storage and retrieval of continuous video recordings, although the techniques disclosed herein are not limited to continuous video recordings. For example, in the case of surveillance footage from a security camera, the data processing application will not repeatedly store captured data relating to background imagery (e.g., an empty parking lot) to the vector database, since the information associated with the background imagery would already be stored in the vector database from previous recordings. In contrast, the data processing application would store captured data relating to new imagery (e.g., a particular car entering the parking lot) in the form of at least one feature embedding, since the addition of the corresponding feature embedding(s) to the vector database would result in improved reconstruction of the video segment containing the particular car entering the parking lot. This process results in reduced file sizes compared to existing technologies (e.g., storing every frame of the video) while reducing quality loss. The data processing application continues to update the vector database as new video recordings are received, which may result in continuously improved text-to-video, video-to-text, and video searching functionalities.

The methods and systems disclosed herein help to improve on existing technologies by enabling advanced video searching functionality. For example, by associating generated textual descriptions, visual features, feature embeddings, or any combination thereof to video segments or scenes and storing the generated textual descriptions, visual features, feature embeddings, or any combination thereof in a database, the data processing application may, for instance: receive a search query; find and retrieve relevant textual descriptions, visual features, feature embeddings, or any combination thereof in the vector database; use the textual descriptions, visual features, feature embeddings, or any combination thereof to generate a textual response to the search query; generate a video in response to the search query; retrieve the corresponding original video segment or scene; or any combination thereof. This may offer significant improvement relative to existing video searching technologies (e.g., searching only by time stamps).

DETAILED DESCRIPTION

Figure 1A:
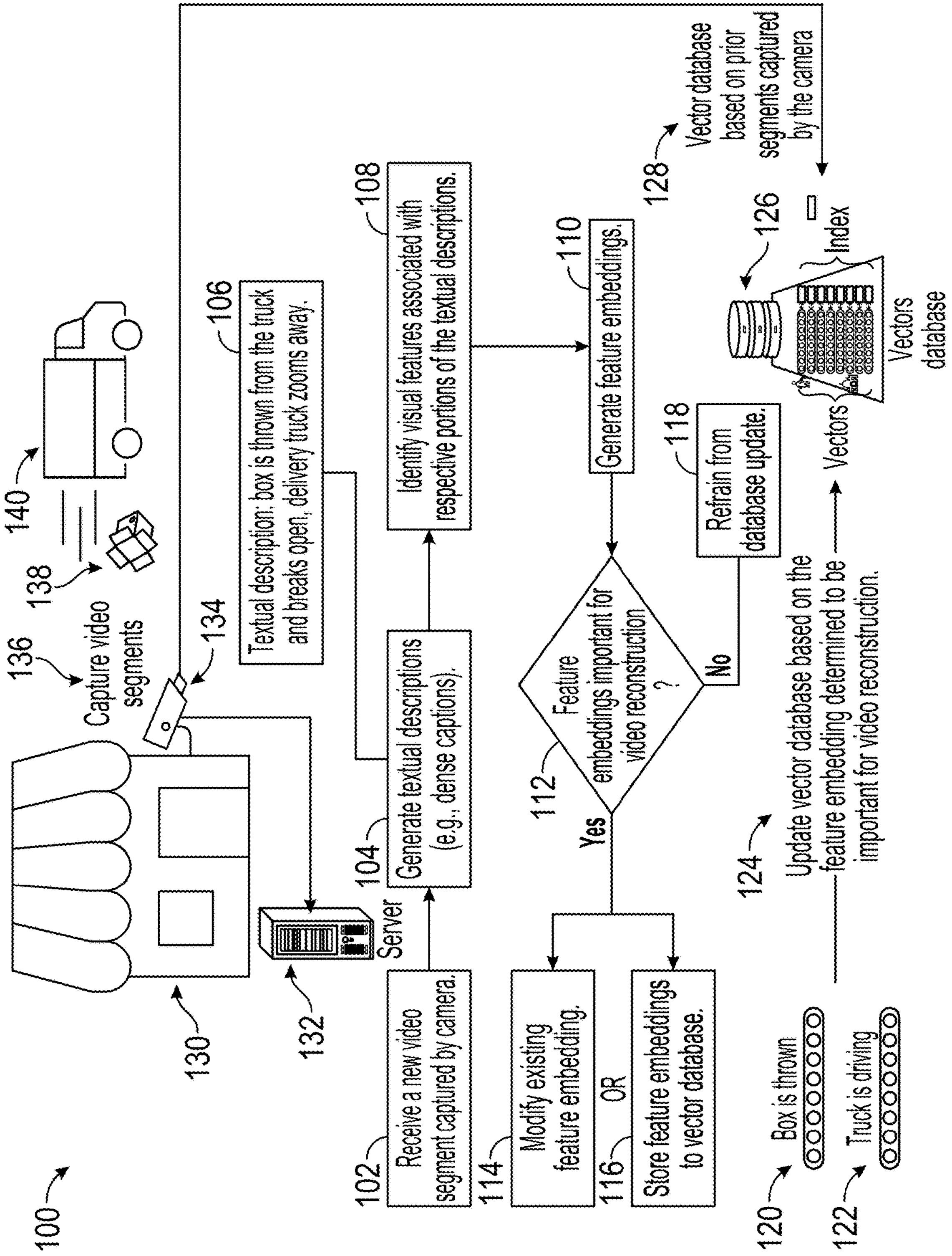
FIG. 1A depicts a schematic illustration of receiving a new video segment, generating feature embedding data structures, and determining whether to update the vector database based on the feature embedding data structures, in accordance with some embodiments of this disclosure.

The above and other objects and advantages of the disclosure will be apparent upon consideration of the following detailed description, taken in conjunction with the accompanying drawings, in which the reference characters refer to like parts throughout. The methods and systems are described herein for efficient video storage and retrieval. A particular component to these methods and systems is the selective population of a vector database comprising indexed feature embeddings. The feature embeddings may correspond to identified key features of a video segment and may comprise textual descriptions, links to textual descriptions, visual features, or any combination thereof.

The textual descriptions may be generated using Natural Language Processing (NLP) models such as Recurrent Neural Networks (RNNs), Long Short-Term Memory (LSTM) models, Large Language Models (LLMs), Transformer-based models, or any combination therein. Each of these models may comprise at least one neural network. A neural network is a machine learning model comprising connected nodes, typically aggregated into layers, wherein each node connection may comprise a non-linear activation function (e.g., sigmoid function, rectified linear unit) parametrized by respective weights. The training of a neural network may be performed by adjusting its parameters with the goal of minimizing the output value of a loss function. For an image generation task, the loss function may be the mean squared error (MSE) between the pixel intensity values of an original image and a reconstruction of the original image, where the mean is taken over all pixels and all color channels (e.g., RGB). The exploration of the parameter space of the neural network may be performed using optimization techniques which utilize backpropagation of derivatives of the loss function with respect to the model parameters (e.g., stochastic gradient descent). Recurrent Neural Networks (RNNs) are a class of neural networks which process data across multiple time steps and are typically used for time series tasks (e.g., speech recognition, stock price prediction). Long Short-Term Memory (LSTM) models are a type of RNN. Transformer-based models are a type of neural network that are based on a multi-head attention mechanism. Transformer-based models are commonly used for both NLP and computer vision tasks. The visual features associated with the textual descriptions may be generated using neural networks (e.g., Convolutional Neural Network). Convolutional Neural Networks (CNNs) are a type of neural network commonly used for image classification and object recognition tasks.

In some embodiments, Retrieval-Augmented Generation (RAG) is a method for selectively retrieving relevant information from databases (e.g., vector databases). The retrieved relevant information may be used as an input for generative models (e.g., video generation models, text generation models). RAG may be used to enhance generative models (e.g., models trained with statis training data) with information from external sources (e.g., updated information). The RAG method may allow generative models to use domain-specific and/or updated information that is not present in its static training data. Text-to-video generation may be performed using RNNs, transformer-based models, Generative Adversarial Networks (GANs), Variational autoencoders (VAEs), diffusion models, or any combination therein. The RAG method may comprise determining relevancy levels between a search query and feature embeddings stored in a database (e.g., vector database) and comparing the relevancy levels to a relevancy threshold.

In some embodiments, Reverse Retrieval-Augmented Generation is a method for selectively storing information as indexed feature embeddings to a database (e.g., vector database). The reverse RAG method may comprise determining whether to store a feature embedding to a database (e.g., vector database) based on determining whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model. The reverse RAG method may comprise determining whether to store additional information (e.g., additional feature embeddings) based on a determined accuracy level associated with a result of a generation task (e.g., video generation, text generation) relative to an accuracy threshold. The combined use of reverse RAG for selectively populating the vector database with feature embeddings and RAG for retrieving feature embeddings and/or textual descriptions relevant to a search query enable efficient, accurate, and contextually relevant text-to-text and text-to-video generation and video searching functionalities.

Figure 1B:
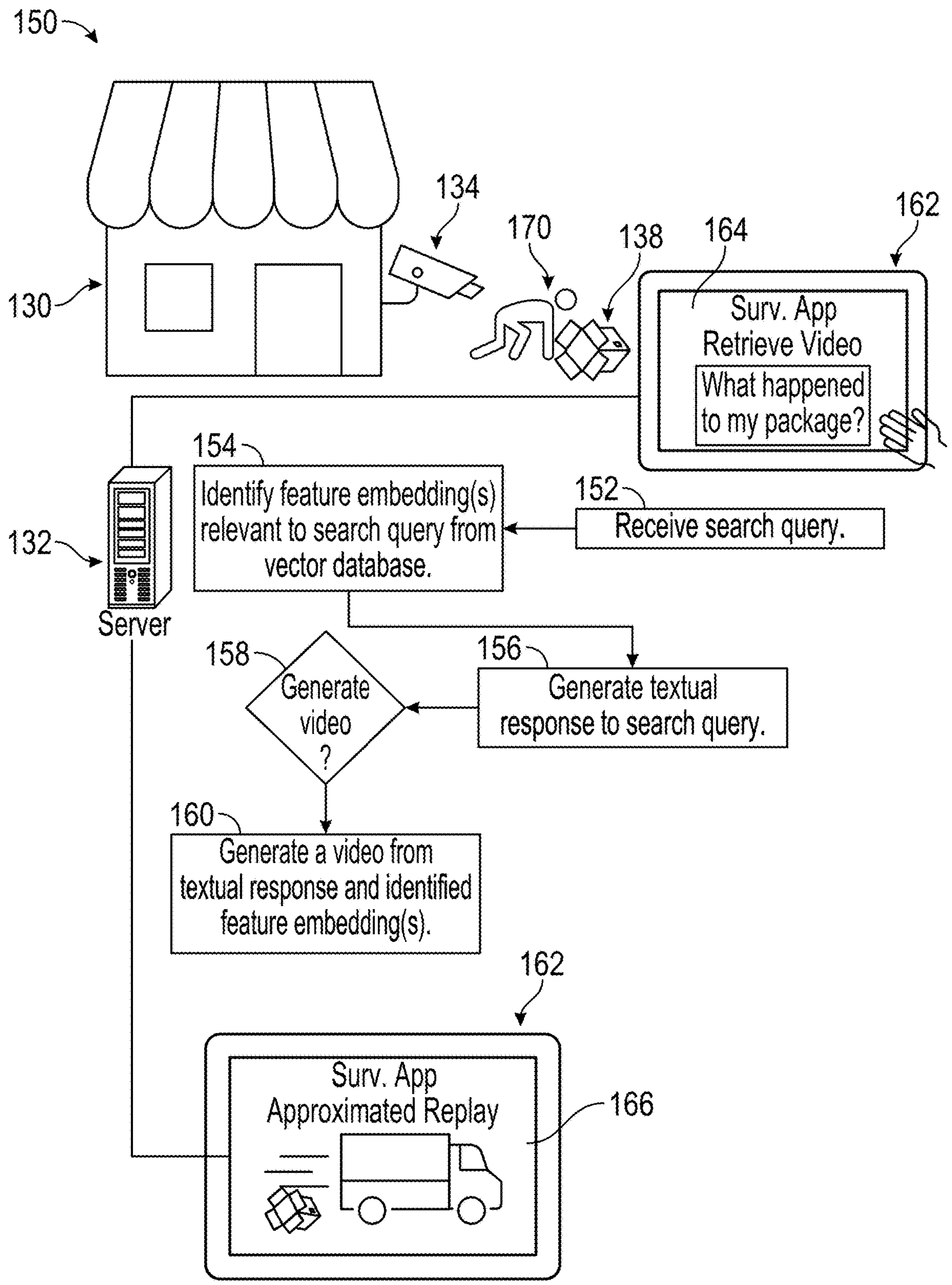
FIG. 1B depicts a schematic illustration of receiving a search query, identifying feature embedding(s) and/or textual descriptions relevant to the search query, generating a textual response, and determining whether to generate a video based on the identified feature embedding(s), textual descriptions, generated textual response, or any combination thereof, in accordance with some embodiments of this disclosure.

FIGS. 1A-B depict schematic illustrations of receiving a new video segment 136, generating feature embedding data structures (e.g., 120 and 122), determining whether to update a vector database 126 based on the feature embedding data structures, receiving a search query, identifying feature embedding(s) and/or textual descriptions relevant to the search query, generating a textual response, and determining whether to generate a video, wherein the video generation is based on the identified feature embedding(s), textual descriptions, generated textual response, or any combination thereof, in accordance with some embodiments of this disclosure.

Figure 10:
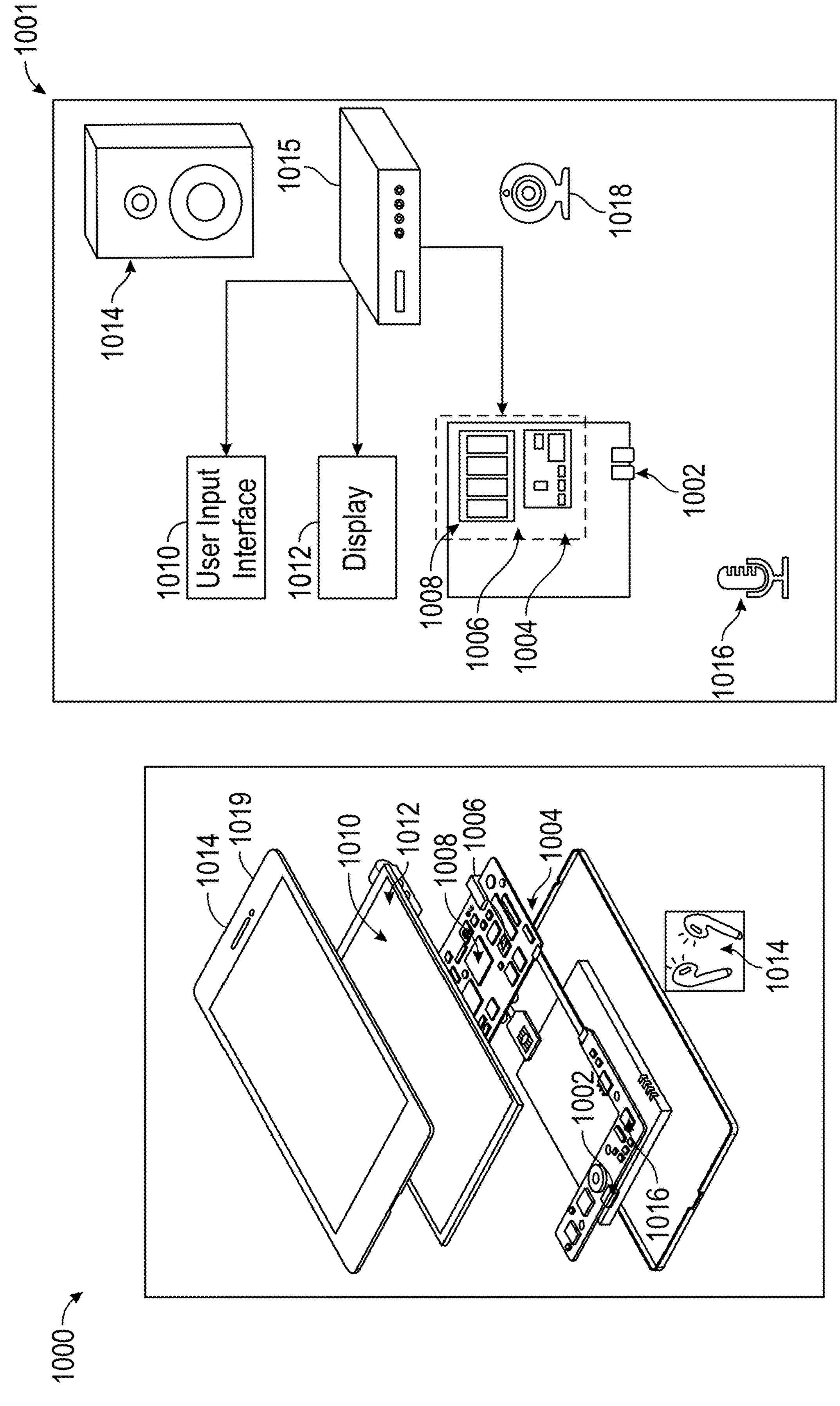
FIG. 10 depicts an illustrative user equipment 1000 and 1001, in accordance with some embodiments of this disclosure.
Figure 11:
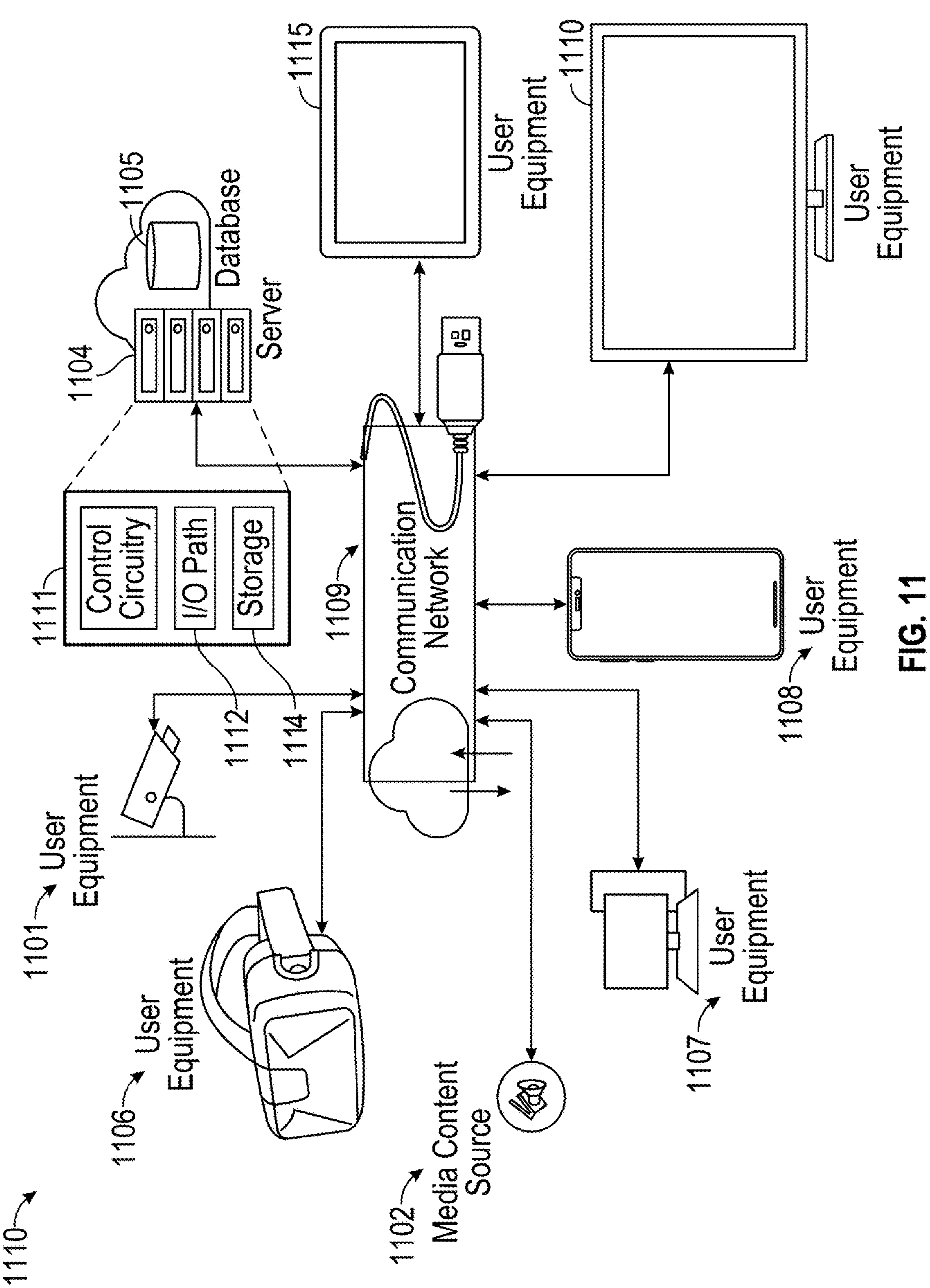
FIG. 11 depicts an illustrative user equipment system, in accordance with some embodiments of this disclosure.

In some embodiments, system 100 includes a sever 132 (e.g., a surveillance system server, server 1104 of FIG. 11) communicatively connected to (e.g., via a network, communication network 1109 of FIG. 11) a camera 134 (e.g., 1018 of FIG. 10, 1101 of FIG. 11) and a user device (e.g., tablet 162, 1115 of FIG. 11). In some embodiments, the system includes multiple servers, multiple cameras, and/or is part of a cloud computing environment. The server may have a non-transitory memory (e.g., storage 1008 of FIG. 10) storing instructions that, when executed, cause a data processing application to run and control the system. In some embodiments, the data processing application is a run via a cloud computing environment, via local storage, or via any combination therein. Sever 132 may store, in non-transitory memory, a vector database 126. The data processing application may be running via control circuitry (e.g., 1004 of FIG. 10, 1111 of FIG. 11) on one or more of a server, mobile services, and/or any other suitable devices or computing devices, or any combination thereof. For example, the system may be a surveillance system comprising a surveillance camera that captures video recordings of a parking lot in front of a storefront. The system may comprise wearable cameras and/or devices that are connected to a server (e.g., server 1104 of FIG. 11) and storage (e.g., storage 1008 of FIG. 10) via a communication network (e.g., communication network 1109 of FIG. 11) and may be used in various contexts such as extreme sports or general life activities (e.g., walking around, washing dishes, driving). In some embodiments, received video segments are stored in their entirety (e.g., on an external storage device, in a cloud computing environment), wherein the methods and systems of this disclosure may be applied to locate and retrieve particular video segments from storage (e.g., based on a search query).

In some embodiments, at 102, the server 132, e.g., when running the data processing application, receives a new video segment (e.g., via input/output circuitry) captured by the camera 134. In some embodiments, the received video segment is a portion of a continuous recording (e.g., surveillance footage). For example, a user device (e.g., surveillance video camera 134) is attached to a building (e.g., storefront 130) and continuously records video of the surrounding area (e.g., a store parking lot). The received video segments may be from a live feed or stream, from wearable devices, or other real-time recording equipment. Continuous video recordings may refer to any captured video that is broken into segments, wherein the segments are processed (e.g., via the data processing application) while video content continues to be captured (e.g., via camera 134). In some embodiments, the video segments are pre-recorded video files received from a local storage device (e.g., hard drives or SSDs, storage 1008 of FIG. 10) or cloud-based storage platforms (e.g., Google Cloud Storage).

In some embodiments, at 104, the server 132, running the data processing application, generates textual descriptions (e.g., dense captions) based on the received video segment. For example, the data processing application generates the textual description 106 that describes box 138 being thrown from truck 140, box 138 breaking open, and truck 140 zooming away. Textual descriptions 106 may be stored as log text format, along with timestamps, in a format that contains a modified version of the text, in a compressed format, as text embeddings, or any combination thereof. In some embodiments, the data processing application analyzes frames from the video segment to identify regions of interest and generate corresponding textual descriptions that capture the activities, objects, and/or contexts present within the regions. The data processing application may identify regions of interest using machine learning models (e.g., CNNs, Region Proposal Networks, Transformer) or a sliding window approach (e.g., checking regions in the video frame bounded by a variety of shapes and sizes). The data processing application may utilize a combination of NLP models (e.g., Recurrent Neural Networks, Long Short-Term Memory networks, Large Language Models, Transformer-based models) to generate textual descriptions of the video segment and/or each identified region of interest. The data processing application may refine the generated textual descriptions using NLP models. In some embodiments, the data processing application uses contextual information from surrounding frames or through iterative feedback mechanisms (e.g., beam search, reinforcement learning) to refine the textual descriptions. The data processing application may apply quality control techniques (e.g., grammatical corrections, synonym replacement, removing redundant information) to the textual descriptions. The data processing application may employ a human-in-the-loop approach, wherein the textual descriptions are reviewed and corrected by at least one human annotator.

In some embodiments, the data processing application determines a scene priority level associated with a scene. As used herein, a scene refers to a received video segment or portion of a received video segment. A scene priority level of a received video segment or portion of a received video segment may be referred to as an importance level of a received video segment or portion of a received video segment. In some other embodiments, the data processing application may determine a scene priority level based on an input on a user device. For example, the data processing application may identify a scene as being of a high scene priority level (e.g., reciting vows during a wedding in a life capture scenario). The data processing application may determine a scene priority level based on the identified references in the textual descriptions, the identified regions of interest, and/or learned user preferences based on previously determined scene priority levels, previous search queries, and/or information tracked by a user device. For example, the data processing application may increase scene priority levels for scenes associated with delivery trucks based on receiving a large number of search queries related to delivery trucks relative to other search query topics (e.g., 533 search queries related to delivery trucks relative to 2 search queries related to bicycles). The data processing application may determine a scene priority level based on the presence or absence of specific (e.g., tagged) content (e.g., a particular person, a large group of people, a person running, a delivery truck) in the scene. In some embodiments, the data processing application receives an input via a user device (e.g., tablet 162), the input comprising an indication of a scene's priority level. The data processing application may compare a scene priority level (e.g., 88.45 on a scale from 0.00 to 100.00 in which a priority level of 0.00 is the lowest priority scene possible and a priority level of 100.00 is the highest priority scene possible) to a predetermined or dynamic scene priority threshold (e.g., 82.33 on a scale from 0.00 to 100.00), wherein a scene with a scene priority level that is greater than the scene priority threshold is considered a priority scene (e.g., priority level 92.65 relative to priority threshold 89.77 on a scale from 0.00 to 100.00). A scene priority threshold may be referred to as an importance threshold. In some embodiments, the data processing application generates textual descriptions at a higher level of detail for priority scenes compared to non-priority scenes, wherein non-priority scenes have scene priority levels that are less than the scene priority threshold (e.g., priority level 86.23 relative to priority threshold 94.18 on a scale of 0.00 to 100.00). The data processing application may store additional data to the vector database as metadata and/or additional feature embeddings. The additional data may comprise entire video segments, portions of video segments, and/or selected frames from video segments. In some embodiments, if the scene priority level is below a scene priority threshold (e.g., priority level 55.62 relative to priority threshold 66.21 on a scale from 0.00 to 100.00), the data processing may modify textual descriptions (e.g., delete portions of textual descriptions) and/or apply compression to the textual descriptions. The compression that is used may depend on the ratio of the priority level to the priority threshold (e.g., the compression ratio depends linearly on the priority level to priority threshold ratio).

In some embodiments, at 108, the data processing application identifies visual features associated with respective portions of the generated textual descriptions. For example, the data processing application identifies visual features associated with box 138 being thrown from truck 140. In some embodiments, the visual features comprise a boxed or any other shaped region or regions of a video frame or video segment. The data processing application may use at least one Natural Language Processing (NLP) technique (e.g., Named Entity Recognition, keyword extraction, dependency parsing) to map references in the textual descriptions to objects, figures, or significant elements to the visual features. The data processing application may generate visual features from at least one neural network (e.g., convolutional neural network layers). The data processing application may map visual features to portions of the textual descriptions using at least one machine learning model (e.g., Contrastive Language-Image Pre-training). The data processing application may focus on persons' visual representations (e.g., faces).

In some embodiments, at 110, the data processing application generates feature embedding data structures, also referred to herein as feature embeddings, based on the generated textual descriptions and identified visual features. For example, the data processing application generates feature embedding 120 associated with box 138 being thrown and feature embedding 122 associated with the truck 140 driving away. The feature embeddings may comprise text, images, videos, numerical data (e.g., vectors of numbers), time stamps, location data, associated scene information, and/or information related to persons or actions present in the scene. In some embodiments, the feature embeddings comprise links to associated textual descriptions, which may be stored in another database, instead of or in addition to comprising the textual descriptions. In some embodiments, the data processing application employs at least one machine learning model (e.g., neural network, convolution neural network, residual neural network, transformer-based model) to generate feature embeddings. The data processing application may optimize feature embeddings through dimensionality reduction (e.g., principal component analysis, t-distributed stochastic neighbor embedding) or feature selection techniques. The data processing application may store multiple versions of a feature embedding for a single feature (e.g., capturing different perspectives or variations). The data processing application may index feature embeddings based on time stamps or associated scenes (e.g., location, participants, actions). The vector database may be organized hierarchically, grouping feature embeddings by categories (e.g., objects, actions, scenes). For example, feature embeddings related to vehicles may be grouped under a "transportation" category, which could be further subdivided into specific types such as "cars," "bicycles," and "planes." In some embodiments, the storage of textual descriptions may be organized hierarchically, grouping textual descriptions by categories (e.g., objects, actions, scenes). For a generated feature embedding associated with a priority scene, the data processing application may generate additional metadata to be included in the feature embedding (e.g., whole video segments, video frames) and/or generate additional feature embeddings associated with the priority scene. In some embodiments, the data processing application may train a mapping function to convert feature embeddings in the current vector database into new feature embeddings in a new vector database. For example, video generation models may evolve over time and may require the structure of the vector database to be updated. In such cases, the data processing application may train a mapping function that, when applied to the vector database or feature embeddings contained within the vector database, make the vector database compatible with a new video generation model.

In some embodiments, at 112, the data processing application determines whether inputting at least a part of a modified version of the vector database to a video generation model, wherein the modification is based on a particular feature embedding data structure, results in sufficiently improved reconstruction of a received video segment, scene, object within a video segment or scene, or any combination thereof compared to inputting at least a part of an unmodified version of the vector database to the video generation model. In some embodiments, based at least in part on determining that inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model, the data processing application modifies the vector database based on the particular feature embedding data structure. The modification to the vector database based on the particular feature embedding data structure may comprise either adding the particular feature embedding to the vector database or updating an existing feature embedding stored in the vector database based on the particular feature embedding.

The data processing application may determine whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model based on at least one user input indicating a preference between the two reconstructions of the received video segment, scene, object within a video segment or scene, or any combination thereof. The data processing application may calculate a first output value of a loss function based on inputting into the loss function a reconstruction of the received video segment, scene, object within a video segment or scene, or any combination thereof that results from inputting at least a part of the modified version of the vector database to the video generation model, wherein the modification is based on the particular feature embedding data structure. The data processing application may calculate a second output value of the loss function based on inputting into a loss function a reconstruction of the received video segment, scene, object within a video segment or scene, or any combination thereof that results from inputting at least a part of the unmodified version of the vector database to the video generation model. The data processing application may determine whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model based at least in part on determining that the first output value of the loss function is less than the second output value of the loss function by at least a predetermined amount. In some embodiments, the data processing application determines whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model based on simulating its impact on video reconstruction (e.g., via an emulation process for one or more of the methods for determining whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model described herein).

In some embodiments, the data processing applications determines that the addition of a generated feature embedding to the vector database is not enough to reconstruct an associated video segment or scene to sufficient accuracy. The determination may be made by comparison to an accuracy level (e.g., 63.2 on a scale from 0.00 to 100.00 in which an accuracy level of 0.00 represents the least accurate reconstruction possible and an accuracy level of 100.00 represents the most accurate reconstruction possible) of the reconstructed video segment or scene relative to an accuracy threshold (e.g., 87.3 on a scale from 0.00 to 100.00). The data processing application may use a predetermined (e.g., 92.86 on a scale from 0.00 to 100.00) or dynamic (e.g., depends linearly on the associated scene priority level) accuracy threshold. The data processing application may dynamically (e.g., linearly, logarithmically, discretely) adjust the accuracy threshold based on the scene priority level, the presence or absence of specific (e.g., tagged) content (e.g., a particular person, a large group of people, a person running, a delivery truck), and/or any other information contained in the associated video segment, scene, or feature embedding. In response to the accuracy level being less than the accuracy threshold, the data processing application may store additional information to the vector database such as a portion (e.g., one frame, one second long clip) of the corresponding video segment or scene, an edge map of the portion, a saliency map of the portion, a depth map of the portion, a human or animal pose map, a low resolution version of the portion, a low bit depth of color version of the portion, a low bitrate version of the portion, or any combination therein.

The data processing application may compare generated feature embeddings to existing feature embeddings stored in the vector database and determine, based on their similarity level (e.g., 93.62 on a scale from 0.00 to 100.00 in which a similarity level of 0.00 represents the least possible similarity between the feature embeddings and a similarity level of 100.00 represents the greatest possible similarity between the feature embeddings) relative to a similarity threshold (e.g., 92.96 on a scale from 0.00 to 100.00), whether to update the vector database based on the generated feature embeddings. The data processing application may use a predetermined (e.g., 92.86 on a scale from 0.00 to 10.00) or dynamic (e.g., depends linearly on the associated scene priority level) similarity threshold to determine whether a feature embedding is similar to another feature embedding. The data processing application may dynamically (e.g., linearly, logarithmically, discretely) adjust the similarity threshold based on the scene priority level, the presence or absence of tagged content (e.g., a particular person, a large group of people, a person running, a delivery truck), and/or other information contained in the video segment, scene, or feature embedding. For example, the data processing application may increase the similarity threshold by a fixed amount (e.g., 13.65 on a scale from 0.00 to 100.00) or a fixed percentage (e.g., 1 percent) based on the presence of tagged content (e.g., a particular person). The data processing application may refine the vector database by applying the reverse retrieval-augmented generation process to existing feature embeddings stored in the vector database periodically (e.g., as new video segments are received, once per day) or selectively (e.g., in response to determining that a new video segment is similar to an existing feature embedding). In some embodiments, refining feature embeddings stored in the vector database may comprise determining whether inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model based at least in part on how long ago the feature embedding was stored to the vector database. For example, a feature embedding associated with adding a pinch of salt to a plate of pasta five years ago may be removed from the vector database.

In some embodiments, at 114, the data processing application determines that inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model and proceeds to modify an existing feature embedding stored in the vector database based on the particular feature embedding. In some embodiments, the system determines that a particular feature embedding (e.g., a newly generated feature embedding) is similar to an existing feature embedding stored in the vector database and still results in sufficiently improved video reconstruction. Based on such a determination, the data processing application may modify an existing feature embedding to include at least a part of the particular feature embedding. For example, the data processing application may determine to modify an existing feature embedding containing information related to background imagery (e.g., a parking lot) to include information contained in the particular feature embedding related to a change in the background imagery (e.g., new lines painted in the parking lot).

In some embodiments, at 116, the data processing application determines that inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model and proceeds to store the particular feature embedding in the vector database. The data processing application may determine that inputting at least a part of a modified version of the vector database to a video generation model, wherein the modification is based on the particular feature embedding data structure, results in sufficiently improved reconstruction of a received video segment, scene, object within a video segment or scene, or any combination thereof compared to inputting at least a part of an unmodified version of the vector database to the video generation model and that the particular feature embedding is not similar to any existing feature embedding stored in the vector database, and, in response, store the generated feature embedding in the vector database. For example, the data processing application may determine that a feature embedding containing information related to a brand new car is not similar to any existing feature embedding stored in the vector database and stores the feature embedding to the vector database. In some embodiments, there are no existing feature embeddings stored in the vector database (e.g., the first time the system receives a video segment). In such a case, the data processing application may add the particular feature embedding to the vector database.

In some embodiments, at 118, the data processing application determines that inputting at least a part of a modified version of the vector database to a video generation model, wherein the modification is based on the particular feature embedding data structure, does not result in sufficiently improved reconstruction of a received video segment, scene, object within a video segment or scene, or any combination thereof compared to inputting at least a part of an unmodified version of the vector database to the video generation model and refrains from updating the vector database based on the particular feature embedding.

In some embodiments, at 152, the data processing application receives, via input/output circuitry, a search query from a user device (e.g., tablet 162). In some embodiments, the search query is a text query from a user device (e.g., tablet 162) or a voice query from a microphone (e.g., microphone 1016 of FIG. 10). For example, the data processing application receives, via input/output circuitry, the search query 164 "What happened to my package?"

In some embodiments, at 154, the data processing application identifies feature embedding(s) and/or textual descriptions relevant to the search query from. For example, feature embedding(s) and/or textual descriptions associated with box 138 (e.g., feature embedding 120 of FIG. 1A) and feature embedding(s) and/or textual descriptions associated with the truck 140 of FIG. 1A (e.g., feature embedding 122 of FIG. 1A) are identified as being relevant to search query 164. In some embodiments, the data processing application processes the search query using NLP techniques before searching the vector database for relevant feature embeddings and/or textual descriptions. The NLP techniques may parse the search query to identify key components that correspond to objects, actions, and/or contexts. For example, for a search query of "a person running in a park," the data processing application may parse the query to identify "person," "running," and "park" as key elements. In some embodiments, the data processing application matches the search query and/or the identified key elements to feature embeddings stored in the vector database and/or textual descriptions. The data processing application may utilize any combination of searching algorithms (e.g., nearest-neighbor search, semantic search) for the matching. The data processing application may utilize context, time stamps, and/or scene priority levels to assist in the matching. In some embodiments, the data processing application performs the matching by ranking feature embeddings stored in the vector database and/or textual descriptions based on their relevance to the search query. The ranking may be based on a relevancy level between the search query and the feature embeddings and/or textual descriptions, a multi-criteria ranking system based on additional factors such as the frequency of the corresponding feature in the video segment or scene, the contextual information of the feature embedding and/or textual descriptions, a user interaction history, or any combination thereof. As referred to herein, a feature embedding with a relevancy level associated with a search query that is above a relevancy threshold is considered to be a feature embedding that is relevant to the search query, or more succinctly, a relevant feature embedding. As referred to herein, a textual description with a relevancy level associated with a search query that is above a relevancy threshold is considered to be a textual description that is relevant to the search query, or more succinctly, a relevant textual description. In some embodiments, the system determines that there are no textual descriptions and/or feature embeddings stored in the vector database with a relevancy level above a relevancy threshold. The data processing application may use a predetermined or dynamic relevancy threshold (e.g., depends linearly on a corresponding scene priority level). The data processing application may dynamically (e.g., linearly, logarithmically, discretely) adjust the relevancy threshold based on a scene priority level associated with a scene referenced in the search query or the presence or absence of tagged content in the search query (e.g., a particular person, a large group of people, a person running, a delivery truck). For example, the data processing application may increase the relevancy threshold by a fixed amount or a fixed percentage based on the presence of tagged content (e.g., a particular person) in the search query.

In some embodiments, at 156, the data processing application generates a textual response to the search query. The data processing application may utilize NLP techniques (e.g., Recurrent Neural Networks, Transformer-based models) in combination with the identified relevant feature embedding(s) and/or textual descriptions to generate a textual response to the search query. In some embodiments, the data processing application determines that there are no textual descriptions and/or feature embeddings stored in the vector database that are above a relevancy threshold, in which case, the data processing application utilizes NLP techniques without reference to any textual descriptions or feature embeddings stored in the vector database to generate a textual response to the search query.

In some embodiments, at 158, the data processing application determines whether to generate a video, wherein generating the video is based on the identified relevant feature embedding(s), the generated textual response to the search query, relevant textual descriptions, or any combination thereof. In some embodiments, the determination is based on a user input via a user device (e.g., tablet 162) indicating whether a video is to be generated. For example, a user equipment device 162 may receive a user interface indication to generate approximated replay video 166.

In some embodiments, at 160, the data processing application may generate a video from the generated textual response to the search query and/or any feature embedding (s) and/or textual descriptions identified as being relevant to the search query. For example, based at least in part on search query 164, the data processing application generates approximated replay video 166 depicting the truck 140 driving away from the broken or damaged package 138. The video generation process may involve multiple stages, including but not limited to an initial rough generation and a subsequent refinement stage in which feature embeddings are used to enhance the quality of the video. For example, if the search query involves "a red car," the feature embedding corresponding to the car's color and shape would influence the generated video frames. In this example, the refinement stage would involve adjusting the generated frames to better match the visual characteristics stored in the vector database. In some embodiments, the video generation process utilizes at least one generative machine learning model (e.g., Generative Adversarial Network, Variational Autoencoder, Transformer-based model, Diffusion model). The data processing application may generate multiple video segments that can be stitched together.

Figure 2:
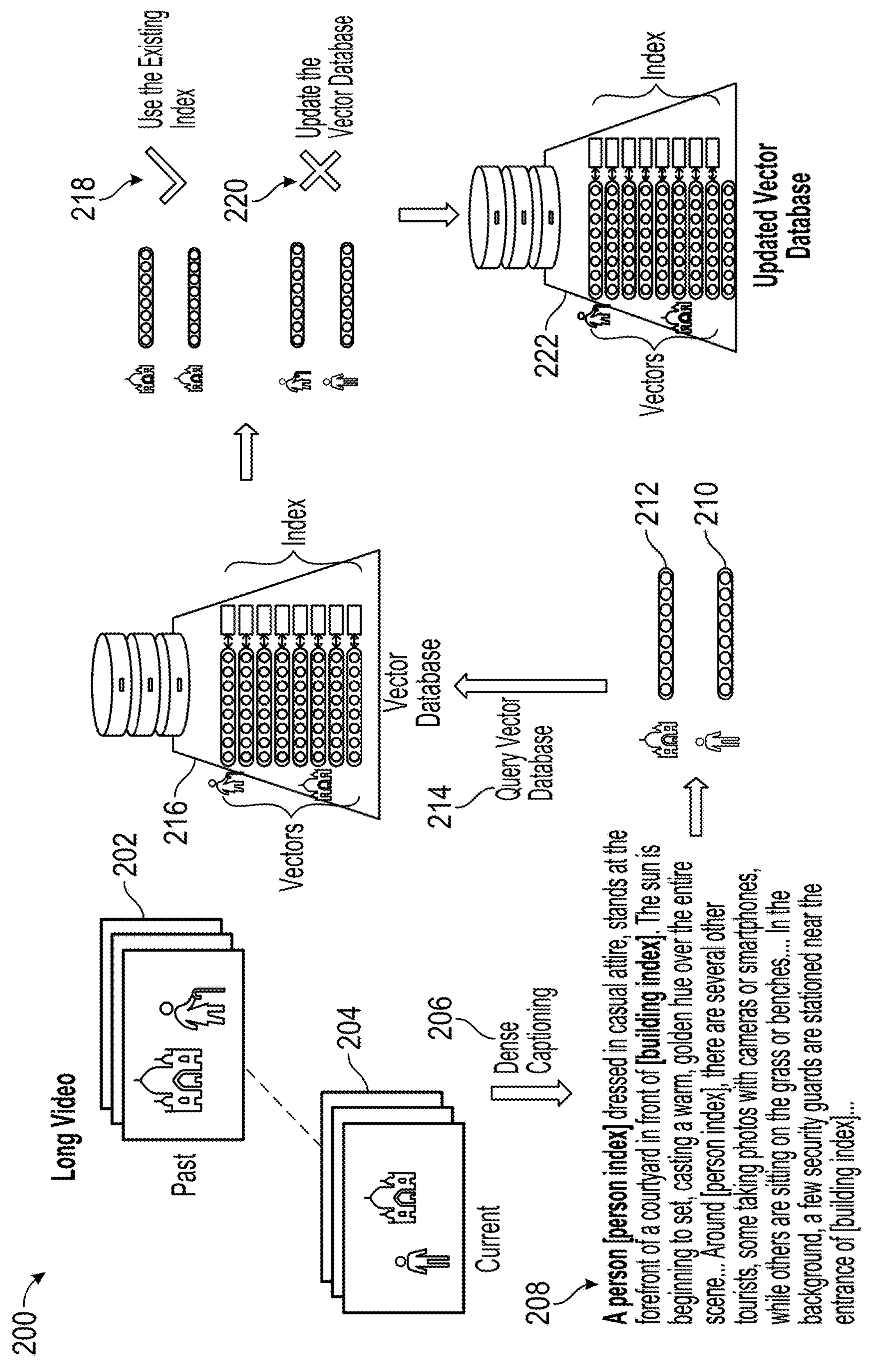
FIG. 2 depicts a schematic illustration of generating textual descriptions (e.g., dense captions) from video segments, identifying associated visual features, generating feature embedding data structures, querying the vector database, and determining whether to update the vector database based on the feature embedding data structures, in accordance with some embodiments of this disclosure.

FIG. 2 depicts a schematic illustration of generating textual descriptions (e.g., dense captions) from video segments (e.g., video segment 204 or 136 of FIG. 1A), identifying associated visual features (e.g., 'a person' and 'the sun' in dense caption 208 or box 138 and truck 140 of FIG. 1A), generating feature embedding data structures (e.g., feature embeddings 210 and 212 or 120 and 122 of FIG. 1A), querying the vector database (e.g., vector database 216 or 126 of FIG. 1A), and determining whether to update the vector database based on the feature embedding data structures, in accordance with some embodiments of this disclosure.

In some embodiments, the system of FIG. 2 is the same as FIGS. 1A-B, where a stationary camera is communicatively connected to a server and a user device. But in some embodiments, the system of FIG. 2 includes a mobile or wearable camera and/or includes a cloud computing environment in which continuous video recordings captured by the mobile or wearable camera are stored. For example, in FIG. 2 a wearable camera may record the video 202 of a scene surrounding a building at sunset, with various individuals in different locations around the building, including tourists and security guards, to be stored in the cloud. In the aforementioned embodiments, the methods of FIG. 2 are compatible with the data captured in system of FIGS. 1A-B.

In some embodiments, at 206, the data processing application generates textual descriptions 208 (e.g., dense captions, textual descriptions 106 of FIG. 1A) based on the received video segment 204 (e.g., 136 of FIG. 1A). Textual descriptions 208 may recite, in the case of FIG. 2: "A person [person index] dressed in casual attire, stands at the forefront of a courtyard in front of [building index]. The sun is beginning to set, casting a warm, golden hue over the entire scene . . . Around [person index], there are several other tourists, some taking photos with cameras or smartphones, while others are sitting on the grass or benches . . . . In the background, a few security guards are stationed near the entrance of [building index] . . . ". The data processing application then generates feature embedding 210 associated with the person from video segment 204 and feature embedding 212 associated with the building from video segment 204. In the recording of FIG. 1A, the textual description 106 may be "box is thrown from the truck and breaks open, delivery truck zooms away".

In some embodiments, at 214, the data processing application queries the vector database 216 to determine whether inputting at least a part of a modified version of the vector database to a video generation model, wherein the modification is based on the particular feature embedding data structure (e.g., feature embedding 210, feature embedding 212), results in sufficiently improved reconstruction of a received video segment, scene, object within a video segment or scene, or any combination thereof compared to inputting at least a part of an unmodified version of the vector database to the video generation model. In some embodiments, the data processing application determines a similarity level between the new feature embeddings 210 and 212 and existing feature embeddings stored in the vector database 216 to determine whether existing feature embeddings stored in the vector database will be modified based on the new feature embeddings.

In some embodiments, at 218, the data processing application determines that inputting at least a part of a modified version of the vector database to a video generation model, wherein the modification is based on the new feature embedding 212 associated with the building from video segment 204, does not result in sufficiently improved reconstruction of a received video segment, scene, object within a video segment or scene, or any combination thereof compared to inputting at least a part of an unmodified version of the vector database to the video generation model. The determination may be based on the feature embedding 212 associated with the building from video segment 204 having a similarity level that is greater than a similarity threshold relative to an existing feature embedding stored in the vector database (e.g., a feature embedding associated with the building from video segment 202). This may be because the information required to accurately reconstruct the building in video segment 204 is already contained in a feature embedding associated with the building from video segment 202. In some embodiments, the data processing application determines to not generate a feature embedding would contain information already contained in an existing feature embedding stored in the vector database.

In some embodiments, at 220, the data processing application determines that inputting at least a part of a modified version of the vector database to a video generation model, wherein the modification is based on the new feature embedding 210 associated with the person from video segment 204, results in sufficiently improved reconstruction of a received video segment, scene, object within a video segment or scene, or any combination thereof compared to inputting at least a part of an unmodified version of the vector database to the video generation model. The determination may be based on determining that the feature embedding 210 associated with the person from video segment 204 has a similarity level that is less than a similarity threshold relative to an existing feature embedding stored in the vector database (e.g., a feature embedding associated with the person from video segment 202). This may be because the information required to accurately reconstruct the person in video segment 204 is not contained in a feature embedding associated with the person from video segment 202. Accordingly, the data processing application updates the vector database 222 to include feature embedding 210, along with its associated index (e.g., time stamp), while refraining from unnecessarily including feature embedding 212.

Figure 3:
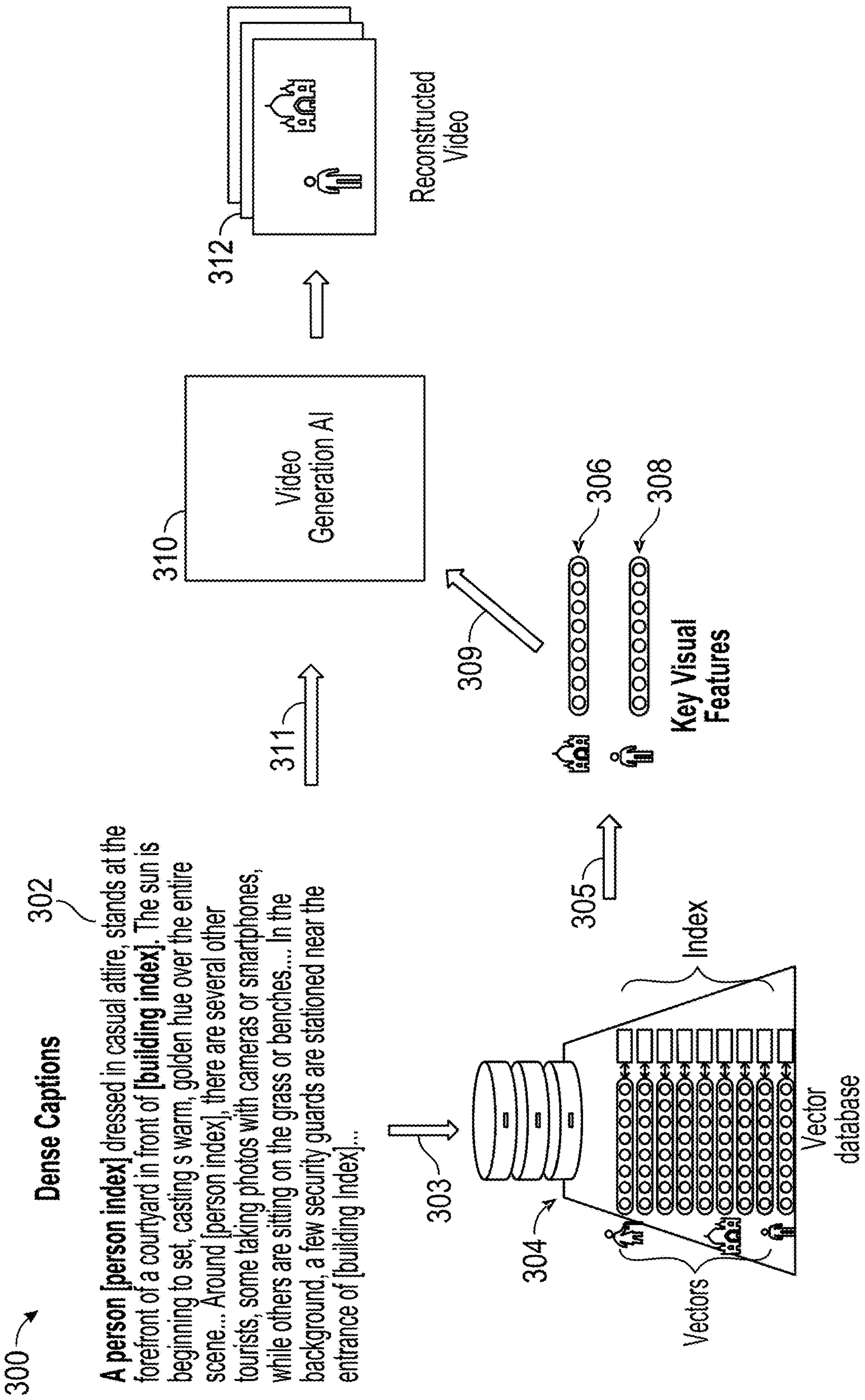
FIG. 3 depicts a schematic illustration of generating a video from textual descriptions (e.g., dense captions) and relevant feature embeddings from the vector database, in accordance with some embodiments of this disclosure.

FIG. 3 depicts a schematic illustration of generating a video (e.g., replay video 166 of FIG. 1B) from textual descriptions (e.g., dense captions) and/or relevant feature embeddings from the vector database, in accordance with some embodiments of this disclosure. In FIG. 3, the textual description is that of FIG. 2, describing a scene surrounding a building at sunset, with various individuals in different locations around the building, including tourists and security guards.

In some embodiments, at 303, the data processing application queries the vector database 304 based on textual descriptions 302 (e.g., dense captions) to locate relevant feature embeddings. The textual descriptions may have been retrieved previously from the vector database 304 based on a search query (e.g., search query 164 of FIG. 1B).

In some embodiments, at 305, the data processing application identifies key visual features and their respective feature embeddings, 306 and 308 (e.g., 120 and 122 in FIG. 1A), from the vector database 304 that are associated with the textual descriptions 302. In some embodiments, the data processing application processes the textual descriptions 302 using NLP techniques before searching the vector database for relevant feature embeddings. The NLP techniques may parse the textual descriptions to identify key components that correspond to objects, actions, and/or contexts (e.g., person, building). In some embodiments, the data processing application matches the textual descriptions and/or the identified key elements to feature embeddings stored in the vector database. The data processing application may utilize any combination of searching algorithms (e.g., nearest-neighbor search, semantic search) for the matching. The data processing application may utilize context, time stamps, and/or scene priority levels to assist in the matching. In some embodiments, the data processing application ranks the identified matched feature embeddings based on their relevance to the textual descriptions, as determined via a relevancy level relative to a relevancy threshold.

In some embodiments, at 309, the data processing application inputs the identified textual descriptions (e.g., dense captions 302 or 106 in FIG. 1A) and/or feature embeddings 306 and 308 (e.g., 120 and 122 in FIG. 1A) into a video generation model 310 to generate reconstructed video 312 to be displayed on a user device (e.g., tablet 162 of FIG. 1B). The video generation process may involve multiple stages, including but not limited to an initial rough generation and a subsequent refinement stage in which feature embeddings are used to enhance the quality of the video. In some embodiments, the video generation process utilizes at least one generative machine learning model (e.g., Generative Adversarial Network, Variational Autoencoder, Transformer-based model, Diffusion model). The data processing application may generate multiple video segments that may be stitched together.

In some embodiments, at 311, the data processing application inputs the textual descriptions (e.g., dense captions 302 or 106 in FIG. 1A) into a video generation model 310 to generate reconstructed video 312, without inputting feature embeddings 306 and 308 to generate reconstructed video 312. In this approach of generating reconstructed video 312 using only textual descriptions, the system may then refine the generated video 312 using feature embeddings 306 and 308.

Figure 4:
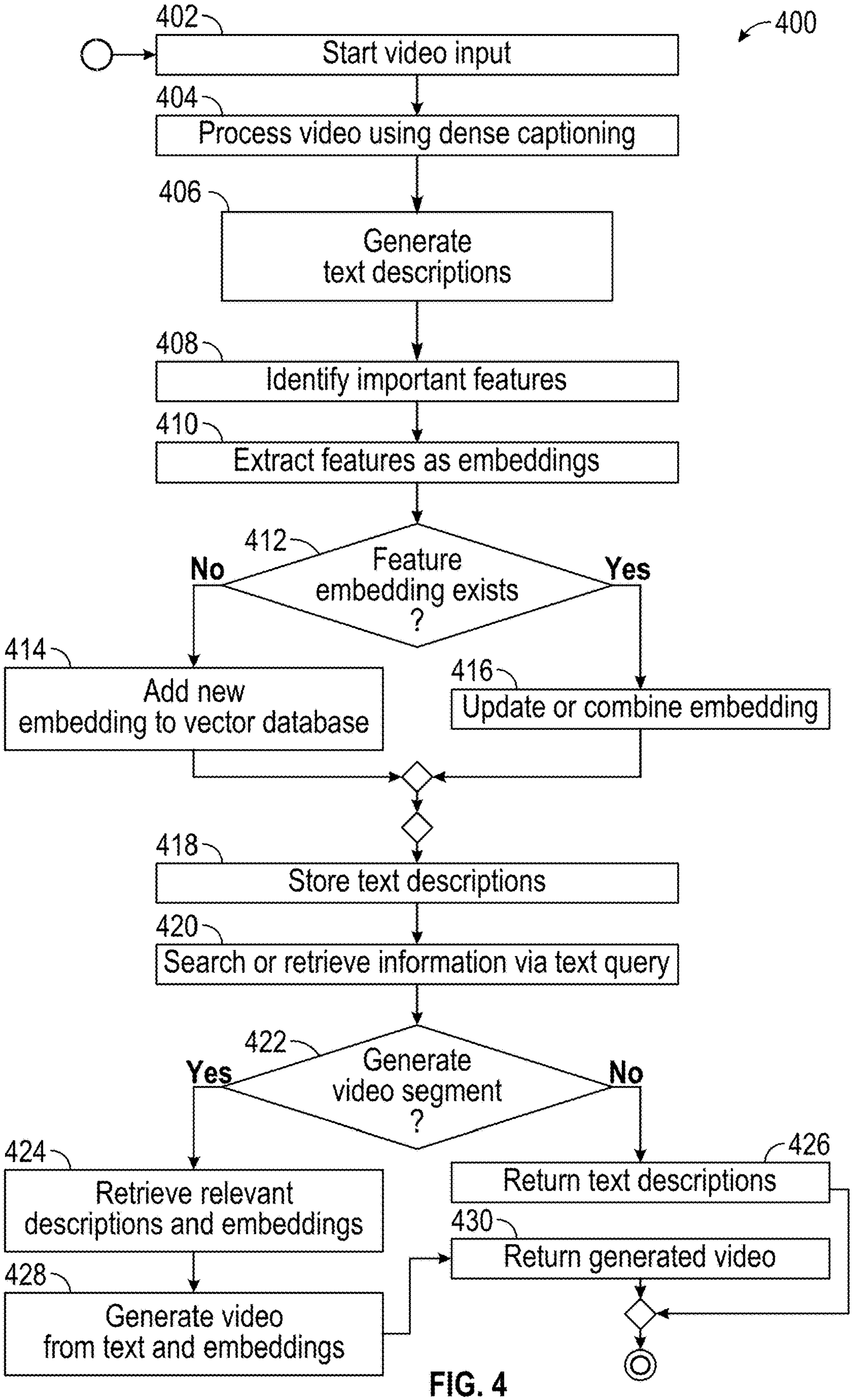
FIG. 4 depicts a flow diagram of a process for extracting feature embeddings from a video input, determining whether to update the vector database based on the feature embeddings, receiving a search query (e.g., text query), determining whether to generate a video segment, returning text descriptions if not generating a video, and otherwise retrieving feature embeddings and/or textual descriptions relevant to the search query and returning a generated video, in accordance with some embodiments of this disclosure.

FIG. 4 depicts a flow diagram of a process for extracting feature embeddings from a video input (e.g., via the data processing application), determining whether to update the vector database based on the feature embeddings, receiving a search query (e.g., text query), determining whether to generate a video segment (e.g., video segment 166 of FIG. 1B), returning text descriptions if not generating a video, and otherwise retrieving feature embeddings and/or textual descriptions relevant to the search query and returning a generated video (e.g., to user device 162 of FIG. 1B), in accordance with some embodiments of this disclosure.

In some embodiments, at 402, input/output circuitry (e.g., input/output circuitry 1111 of FIG. 11) receives a video segment as input. For example, the video segment may be captured by the camera 134 of FIG. 1A. In some embodiments, the received video segment is a portion of a continuous recording (e.g., surveillance footage).

In some embodiments, at 404, control circuitry (e.g., 1004 of FIG. 10, 1111 of FIG. 11) processes the received video segment (e.g., using dense captioning). In some embodiments, the processing comprises analyzing frames from the video segment to identify regions of interest and generate corresponding textual descriptions that capture the activities, objects, and/or contexts present within the regions. The control circuitry may identify regions of interest by utilizing machine learning models (e.g., CNNs, Region Proposal Networks, Transformer) or a sliding window approach (e.g., checking regions in the video frame bounded by a variety of shapes and sizes). In some embodiments, the control circuitry performs frame extraction by sampling frames from the video segment at regular intervals. In some embodiments, the control circuitry utilizes scene change detection algorithms to extract frames at points where significant changes occur. The control circuitry may adjust the resolution of extracted frames (e.g., downscaling the resolution from 720p to 480p). The control circuitry may dynamically adjust the resolution of extracted frames based on a determined complexity level of the content, with more intricate scenes being extracted at higher resolution than less intricate scenes. In some embodiments, the control circuitry converts the video frames from their original color space (e.g., RGB) to a different color space (e.g., grayscale or YUV). The control circuitry may apply noise reduction techniques to the video frames (e.g., applying filters to each frame). The control circuitry may process video segments by adjusting brightness, contrast, sharpness, or any combination thereof.

In some embodiments, at 406, the control circuitry generates textual descriptions based on the received video segment. For example, the control circuitry generates the textual description 106 of FIG. 1A that describes box 138 of FIG. 1A being thrown from truck 140 of FIG. 1A, box 138 of FIG. 1A breaking open, and truck 140 of FIG. 1A zooming away.

In some embodiments, at 408, the control circuitry identifies visual features associated with respective portions of the generated textual descriptions. For example, the control circuitry identifies visual features associated with box 138 of FIG. 1A being thrown from truck 140 of FIG. 1A.

In some embodiments, at 410, the control circuitry generates feature embeddings based on the generated textual descriptions and identified visual features. For example, the control circuitry generates feature embedding 120 of FIG. 1A associated with box 138 of FIG. 1A being thrown and feature embedding 122 of FIG. 1A associated with the truck 140 of FIG. 1A driving away.

In some embodiments, at 412, the control circuitry determines whether the generated feature embedding is similar to a feature embedding that is stored in the vector database. The control circuitry may compare the generated feature embedding to existing feature embeddings stored in the vector database and determine, based on their similarity, whether to update the vector database based on the generated feature embedding.

In some embodiments, at 414, the control circuitry determines that the generated feature embedding is not similar to a feature embedding that is stored in the vector database and proceeds to store the generated feature embedding to the vector database.

In some embodiments, at 416, the control circuitry determines that the generated feature embedding is similar to a feature embedding that is stored in the vector database and proceeds to modify an existing feature embedding stored in the vector database based on the generated feature embedding.

In some embodiments, at 418, the control circuitry stores textual descriptions.

In some embodiments, at 420, the control circuitry receives a search query. For example, the input/output circuitry receives the search query 164 of FIG. 1B "What happened to my package?"

In some embodiments, at 422, the control circuitry determines whether to generate a video in response to the search query. In some embodiments, the determination is based on a user input indicating whether a video is to be generated. For example, a user may input into user equipment device 162 of FIG. 1B an indication to generate approximated replay video 166 of FIG. 1B.

In some embodiments, at 424, in response to determining to generate a video, the control circuitry identifies feature embedding(s) and/or textual descriptions relevant to the search query from the vector database. For example, feature embedding(s) and/or textual descriptions associated with box 138 of FIG. 1A (e.g., feature embedding 120 of FIG. 1A) and feature embedding(s) associated with the truck 140 of FIG. 1A (e.g., feature embedding 122 from FIG. 1A) are identified as being relevant to search query 164 of FIG. 1B.

In some embodiments, at 426, in response to determining not to generate a video, the control circuitry identifies feature embedding(s), including associated textual descriptions relevant to the search query from the vector database, and returns, via input/output circuitry, the textual descriptions to a user device. In some embodiments, in response to determining not to generate a video, the control circuitry identifies textual descriptions relevant to the search query and returns, via input/output circuitry, the textual descriptions to a user device.

In some embodiments, at 428, the control circuitry generates a video based on the feature embedding(s) and/or the textual description(s) identified as being relevant to the search query. For example, based at least in part on search query 164 of FIG. 1B, the control circuitry generates approximated replay video 166 of FIG. 1B depicting the truck 140 of FIG. 1A driving away from the broken package 138 of FIG. 1A. In some embodiments, at 430, the input/output circuitry returns the generated video to a user device.

Figure 5:
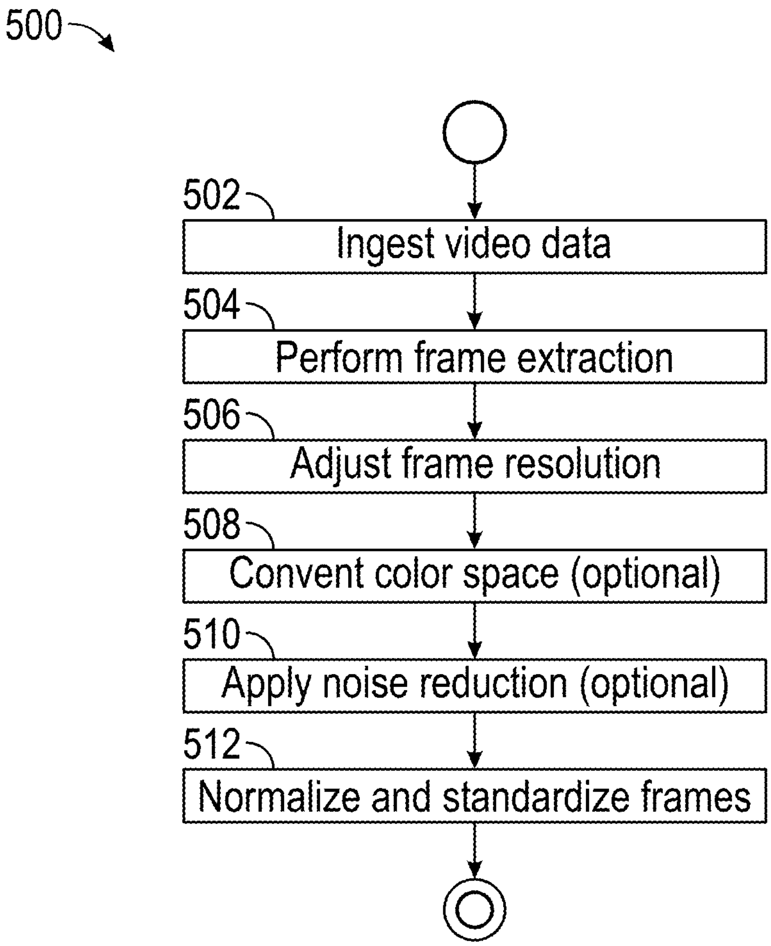
FIG. 5 depicts a flow diagram of a process for video preprocessing, in accordance with some embodiments of this disclosure.

FIG. 5 depicts a flow diagram of a process for video preprocessing 500, in accordance with some embodiments of this disclosure.

In some embodiments, at 502, the input/output circuitry (e.g., input/output circuitry 1112 of FIG. 11) receives a new video segment (e.g., 136 of FIG. 1A). The control circuitry (e.g., control circuitry 1111 of FIG. 11) may preprocess the video before generating textual descriptions (e.g., dense captions, 106 of FIG. 1A) to optimize the processing efficiency of the video in the steps of the disclosed method.

In some embodiments, at 504, the control circuitry extracts frames from the received video segment. In some embodiments, the control circuitry samples frames from the video at regular intervals. For example, the control circuitry extracts every $n^{th}$ frame based on a sample rate of 1/n, which can be adjusted depending on the video's frame rate, a required level of detail indicated by a user or inferred by the control circuitry, and/or an associated scene priority level. In some embodiments, the control circuitry employs scene change detection algorithms to extract frames at points where significant changes in scene occur, ensuring that only the most relevant frames are processed. In some embodiments, the control circuitry will sample the key frames of a video based on an encoding process (e.g., setting key frames to the I-frames of an encoding process).

In some embodiments, at 506, the control circuitry adjusts the frame resolution of the extracted frames. In some embodiments, the resolution downscales to a standard size (e.g., 720p or 480p) to reduce computational load while preserving enough detail for dense captioning and feature extraction. In some embodiments, the control circuitry dynamically adjusts the resolution based on the scene's complexity, maintaining higher resolution for scenes with intricate details and lower resolution for simpler scenes. The complexity of a scene may be based on the corresponding scene priority level.

After adjusting the frame resolution, the control circuitry may take additional processing steps to further simplify later processing steps of the disclosed. For example, at 508, the control circuitry may convert the color space of the video frames. The control circuitry may convert the video frames from their original color space (e.g., RGB) to a different color space (e.g., grayscale or YUV). Such a conversion may reduce computational complexity without significantly affecting the accuracy of the feature extraction and text description generation processes. In some embodiments, at 510, the control circuitry applies noise reduction techniques to the video frames to enhance image quality and remove visual noise. The visual noise reduction improves the performance of subsequent dense captioning and feature extraction steps.

In some embodiments, at 512, the control circuitry normalizes and standardizes the video frames to a consistent format. For example, the control circuitry may adjust the brightness, contrast, and/or sharpness to ensure uniformity across all frames. Such standardization may improve operation consistency of the dense captioning and feature extraction algorithms.

Figure 6:
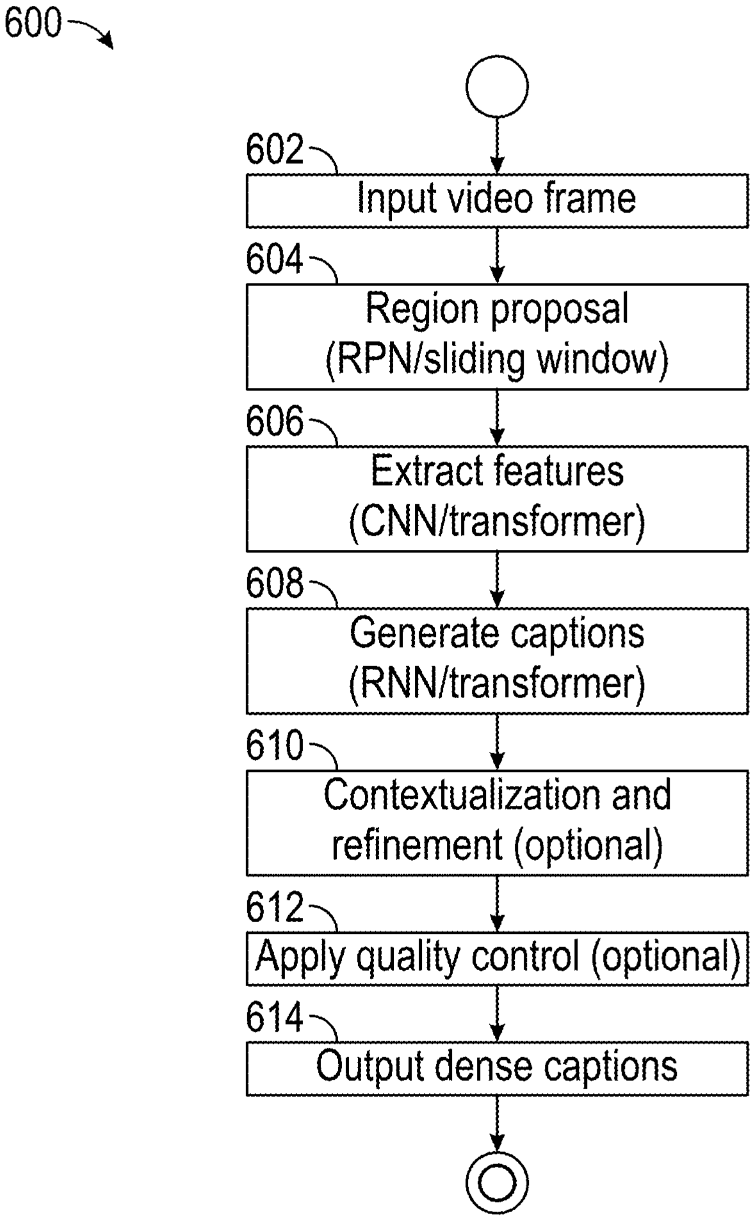
FIG. 6 depicts a flow diagram of a process for generating textual descriptions (e.g., dense captions) of video segments, in accordance with some embodiments of this disclosure.

FIG. 6 depicts a flow diagram of a process for generating textual descriptions (e.g., dense captions) of video segments 600, in accordance with some embodiments of this disclosure. The dense captioning process involves analyzing each frame to identify multiple regions of interest 604 and generating corresponding descriptions of each region that capture activities, objects, and contexts present within each region.

In some embodiments, at 602, the input/output circuitry (e.g., input/output circuitry 1112 of FIG. 11) inputs a video frame to begin the process for generating textual descriptions 600. After the input/output circuitry inputs the video frame, the control circuitry (e.g., control circuitry 1111 of FIG. 11) may identify regions of interest at 604. In some embodiments, the control circuitry identifies these regions using a Region Proposal Network (RPN). For example, the RPN may generate bounding boxes around potential objects or areas of significance. In some embodiments, the control circuitry uses a sliding window approach. For example, in the sliding window approach, the control circuitry may systematically divide each frame into smaller regions that are analyzed for content, which helps us ensure that no significant details are overlooked.

In some embodiments, at 606, the control circuitry extracts features from the identified regions of interest. In some embodiments, the control circuitry may use Convolutional Neural Networks (CNNs) to extract features that will be inputted, via input/output circuitry, into a caption generation model. In some embodiments, the control circuitry uses Transformer-based models to extract features. For example, the control circuitry may use a Transformer-based model like a Vision Transformer (ViT), leveraging self-attention mechanisms to capture both local and global dependencies within the video frame.

In some embodiments, at 608, the control circuitry generates captions for each region. In some approaches, the control circuitry uses a Recurrent Neural Network (RNN). The RNN may be a Long Short-Term Memory (LSTM) network. For example, the LSTM network may sequentially generate captions by predicting one word at a time based on the extracted features.

In some embodiments, a Transformer model is used to generate captions. For example, the control circuitry may utilize a transformer model to offer parallel processing capabilities and improved handling of long-range dependencies in generating the textual descriptions. In some approaches, the control circuitry combines both RNNs and Transformers, using RNNs for generating initial captions and Transformers for refining and improving the generated textual descriptions.

In some embodiments, at 610, the control circuitry contextualizes and refines the textual descriptions using contextual information from surrounding frames or through iterative feedback mechanisms. In some embodiments, the control circuitry incorporates contextual information from surrounding frames to refine the generated captions, analyzing the temporal sequence of frames and adjusting the descriptions to ensure the descriptions accurately and consistently reflect ongoing activities. In some embodiments, the control circuitry uses a feedback loop in which the generated textual descriptions are evaluated and refined iteratively. For example, the control circuitry may use techniques such as beam search or reinforcement learning to refine textual descriptions.

In some embodiments, at 612, the control circuitry applies quality control steps to ensure the generated text descriptions are coherent and readable. The quality control steps may include grammatical corrections, synonym replacement, and/or removing redundancies. In some embodiments, the control circuitry applies a human-in-the-loop approach, in which human annotators review and correct the generated textual descriptions. This approach may be used for situations in which the textual descriptions are required to be highly accurate, for example textual descriptions of legal or medical video recordings. In some embodiments, at 614, the input/output circuitry outputs the generated textual descriptions.

Figure 7:
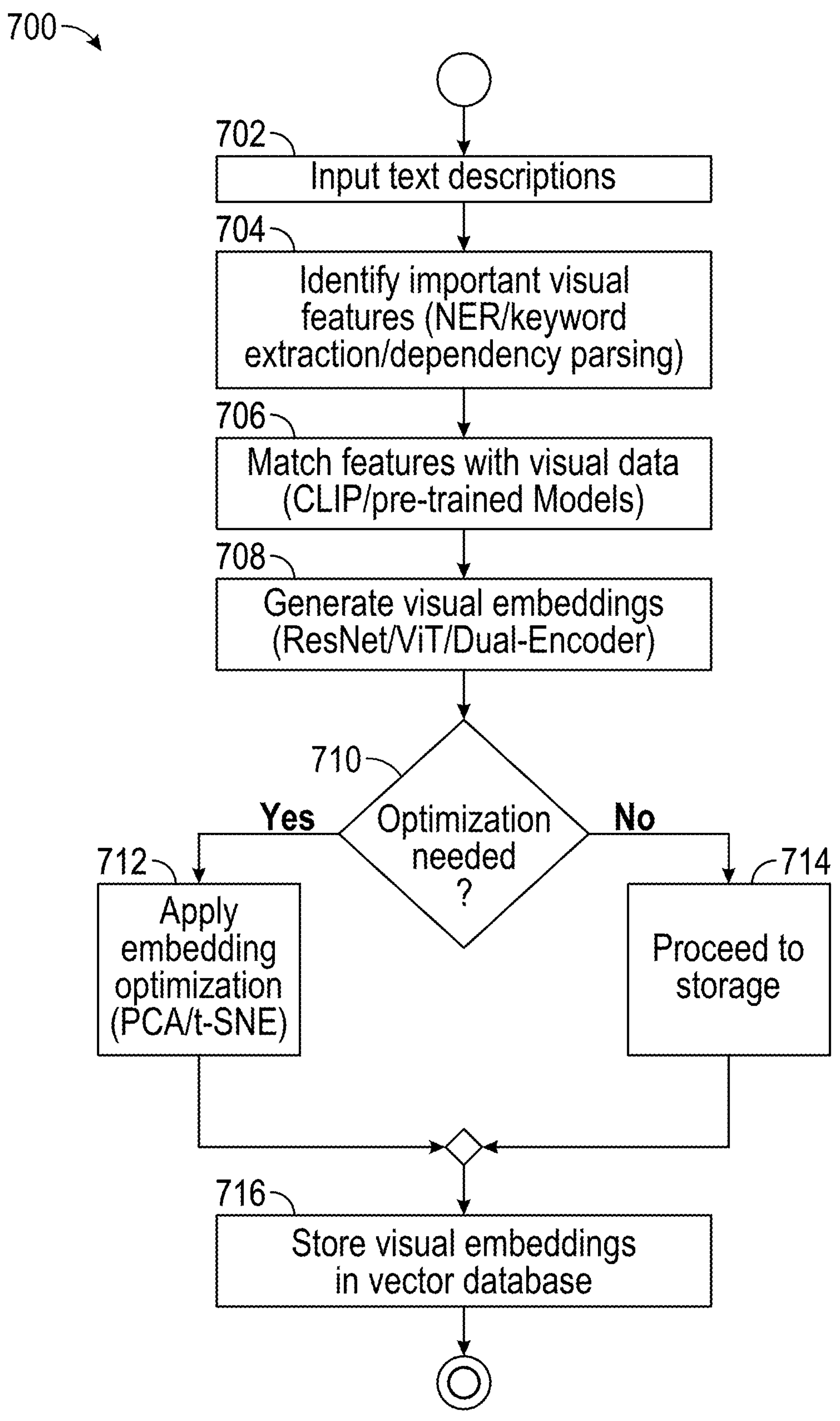
FIG. 7 depicts a flow diagram of a process for generating and storing feature embeddings (e.g., visual embeddings) from textual descriptions, in accordance with some embodiments of this disclosure.

FIG. 7 depicts a flow diagram of a process for generating (e.g., via control circuitry, via the data processing application) and storing (e.g., via input/output circuitry) feature embeddings (e.g., visual embeddings) from textual descriptions, in accordance with some embodiments of this disclosure.

In some embodiments, at 702, the input/output circuitry (e.g., input/output circuitry 1112 of FIG. 11) inputs the textual descriptions into Natural Language Processing (NLP) functions. In some embodiments, at 704, the control circuitry (e.g., control circuitry 1111 of FIG. 11) employs the techniques of the Natural Language Processors to identify textual references to objects, figures, or significant elements within the text descriptions. In some embodiments, the techniques may be Named Entity Recognition (NER) and/or keyword extraction.

In some embodiments, at 706, the control circuitry matches the identified textual references with corresponding visual features from the video frames. In some embodiments, the matching process is a comparison of the textual descriptions with a predefined set of visual categories (e.g., people, objects, animals). In some embodiments, the matching process uses pre-trained visual recognition models to identify the closest visual match. The matching process may use a vision-language model. For example, such a model may be Contrastive Language-Image Pre-Training (CLIP).

In some embodiments, at 708, the control circuitry generates feature embedding(s) (e.g., visual embedding(s)). For example, the control circuitry generates feature embedding 120 of FIG. 1A associated with box 138 of FIG. 1A being thrown and feature embedding 122 of FIG. 1A associated with the truck 140 of FIG. 1A driving away. In some embodiments, the control circuitry employs at least one machine learning model (e.g., neural network, convolution neural network, residual neural network, transformer-based model) to generate feature embeddings. The control circuitry may optimize feature embeddings through dimensionality reduction (e.g., principal component analysis, t-distributed stochastic neighbor embedding) or feature selection techniques. The control circuitry may store multiple versions of the feature embeddings for a single feature (e.g., capturing different perspectives or variations). The control circuitry may index feature embeddings based on time stamps or associated scenes. For a generated feature embedding associated with a priority scene, the control circuitry may generate additional metadata to include in the feature embedding (e.g., whole video segments, video frames) and/or generate additional feature embeddings associated with the priority scene.

In some embodiments, at 710, the control circuitry determines whether the feature embedding(s) need to be optimized (e.g., for storage efficiency). In some embodiments, the control circuitry determines that the embedding(s) do not need to be optimized for storage efficiency. In such cases, at 714, the control circuitry will proceed without optimization and, at 716, store the embedding(s) in the vector database. In some embodiments, at 712, the control circuitry determines the embedding(s) do need to be optimized for storage efficiency. In such cases, the control circuitry applies optimization techniques such as (e.g., principal component analysis, t-distributed stochastic neighbor embedding) or feature selection techniques to ensure storage and retrieval efficiency. In some approaches, the control circuitry generates multiple versions of an embedding to provide more options in video generation tasks. At 716, the input/output circuitry may store the optimized embedding(s) in the vector database, possibly indexed by time stamps and/or associated scenes.

Figure 8:
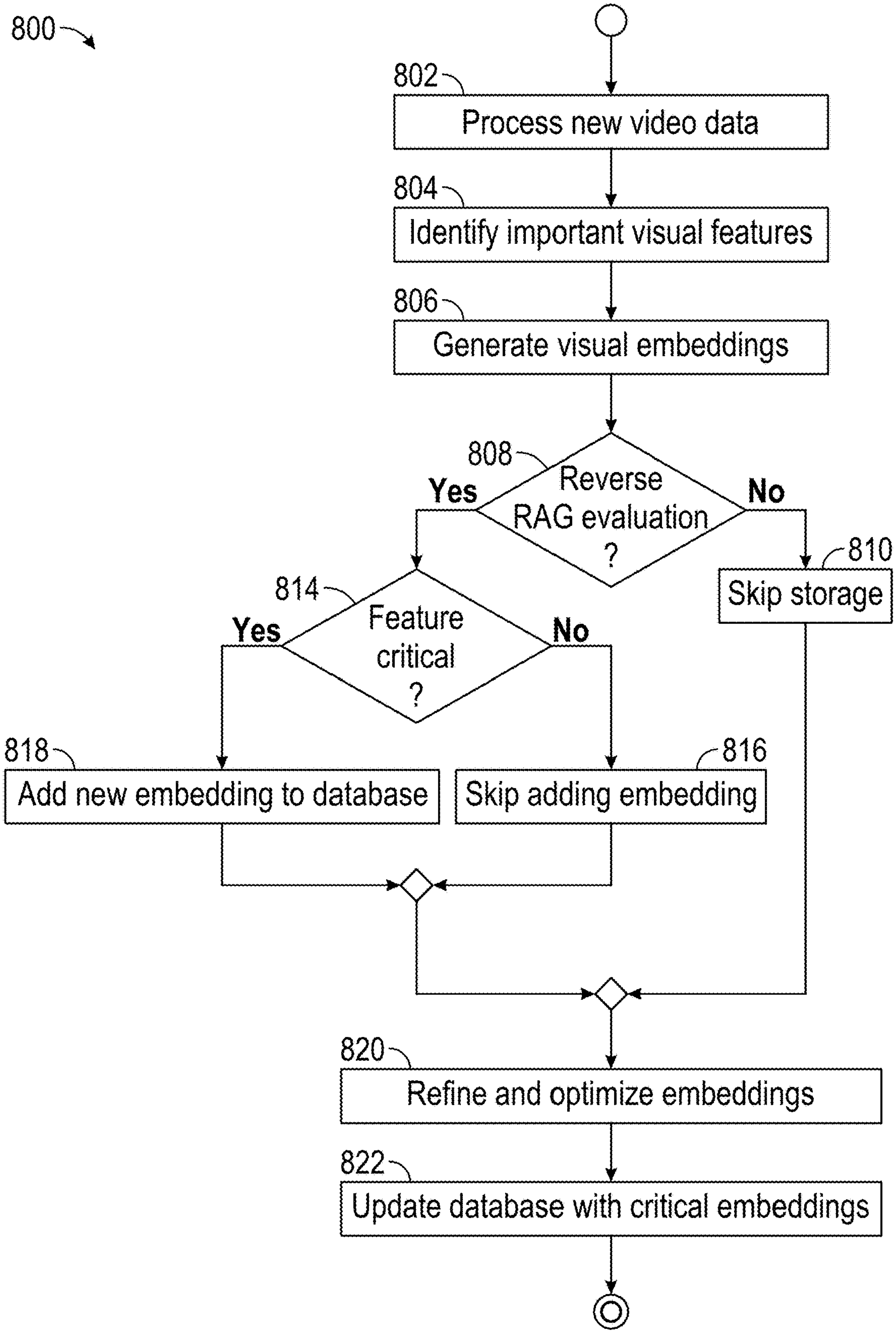
FIG. 8 depicts a flow diagram of a process for generating feature embeddings (e.g., visual embeddings) from video data, determining whether to update the vector database with the feature embedding based on determining whether inputting at least a part of a modified version of the vector database to a video generation model, wherein the modification is based on the feature embedding, results in sufficiently improved reconstruction of a received video segment, scene, object within a video segment or scene, or any combination thereof compared to inputting at least a part of an unmodified version of the vector database to the video generation model, in accordance with some embodiments of this disclosure.

FIG. 8 depicts a flow diagram of a process for generating feature embeddings (e.g., visual embeddings) from video data, determining whether to update the vector database with the feature embedding based on determining whether inputting at least a part of a modified version of the vector database to a video generation model, wherein the modification is based on the feature embedding, results in sufficiently improved reconstruction of a received video segment, scene, object within a video segment or scene, or any combination thereof compared to inputting at least a part of an unmodified version of the vector database to the video generation model, in accordance with some embodiments of this disclosure.

In some embodiments, at 802, the control circuitry (e.g., control circuitry 1111 of FIG. 11) processes new video data (e.g., received via input/output circuitry 1112 of FIG. 11) and creates textual descriptions of the video. For example, the control circuitry generates the textual description 106 of FIG. 1A that describes box 138 of FIG. 1A being thrown from truck 140 of FIG. 1A, box 138 breaking open, and truck 140 zooming away.

In some embodiments, at 804, the control circuitry identifies (e.g., via saliency detection) important visual features of each video frame. In some embodiments, at 806, the control circuitry utilizes Natural Language Processing (NLP) techniques and generates feature embeddings (e.g., visual embeddings). For example, the control circuitry identifies visual features associated with box 138 of FIG. 1A being thrown from truck 140 of FIG. 1A.

In some embodiments, at 808, after generating feature embeddings, the control circuitry exercises a reverse Retrieval-Augmented Generation technique to ensure that only feature embeddings that result in sufficiently improved reconstruction of a received video segment, scene, object within a video segment or scene, or any combination thereof when inputting a least a part of a modified version of the vector database to a video generation model, wherein the modification is based on the feature embeddings, compared to inputting at least a part of an unmodified version of the vector database to the video generation model are stored in the vector database. The control circuitry, via the reverse RAG technique, determines whether new feature embeddings should be added to the database or utilized to update an existing embedding. The control circuitry may determine whether inputting at least a part of a modified version of the vector database to a video generation model, wherein the modification is based on a feature embedding, results in sufficiently improved reconstruction of a received video segment, scene, object within a video segment or scene, or any combination thereof compared to inputting at least a part of an unmodified version of the vector database to the video generation model based on its relevance to an associated scene. For example, the control circuitry may determine a relevancy level of a feature embedding relative to an associated scene and determine whether the relevancy level is above a predetermined or dynamic relevancy threshold. If the control circuitry determines that inputting at least a part of a modified version of the vector database to a video generation model, wherein the modification is based on a feature embedding, does not result in sufficiently improved reconstruction of a received video segment, scene, object within a video segment or scene, or any combination thereof compared to inputting at least a part of an unmodified version of the vector database to the video generation model, the control circuitry will, at 810, will refrain from updating the vector database based on the feature embedding. In some embodiments, the control circuitry uses a two-step approach for determining whether to update the vector database based on a feature embedding. The first step of the two-step approach may be determining whether a similarity level is above a similarity threshold, wherein the similarity level is based on the similarity of the feature embedding to an existing feature embedding stored in the vector database. The second step of the two-step approach may be determining whether inputting at least a part of a modified version of the vector database to a video generation model, wherein the modification is based on the feature embedding, results in sufficiently improved reconstruction of a received video segment, scene, object within a video segment or scene, or any combination thereof compared to inputting at least a part of an unmodified version of the vector database to the video generation model. This approach may enable the system to minimize unnecessary data storage and focus computational resources on maintaining high-quality embeddings.

In some embodiments, at 814, the control circuitry determines whether the feature is critical or impactful. In some embodiments, the control circuitry makes this determination based at least in part on determining whether inputting at least a part of a modified version of the vector database to a video generation model, wherein the modification is based on the feature embedding, results in sufficiently improved reconstruction of a received video segment, scene, object within a video segment or scene, or any combination thereof compared to inputting at least a part of an unmodified version of the vector database to the video generation model. If the control circuitry determines that the feature embedding is not critical, the control circuitry, at 816, may skip adding the embedding to the vector database and may, at 820, use the embedding to refine or optimize existing embeddings. If the control circuitry determines that the feature embedding is critical, the control circuitry, at 818, may add the new embedding into the vector database and/or modify an existing embedding stored in the vector database.

In some embodiments, the control circuitry evaluates the similarity of the embedding relative to existing embeddings stored in the vector database by comparing a similarity level to a similarity threshold. The control circuitry may identify an existing embedding that is similar and proceed to step 816, in which the control circuitry may skip adding the new embedding into the vector database. The control circuitry may also determine that the most similar existing feature embedding in the vector database is not similar enough and proceed to step 818, in which the control circuitry adds the new embedding into the vector database.

In some embodiments, at 820, the control circuitry continuously refines and optimizes embeddings within the vector database, by applying the reverse RAG process to existing feature embeddings stored in the vector database. The control circuitry may identify trends or frequently occurring features and update its processes (e.g., modifying similarity thresholds, accuracy thresholds, and/or scene priority thresholds) to better handle these elements in future reconstructions. In some embodiments, at 822, the control circuitry updates the vector database with new and/or modified feature embeddings.

Figure 9:
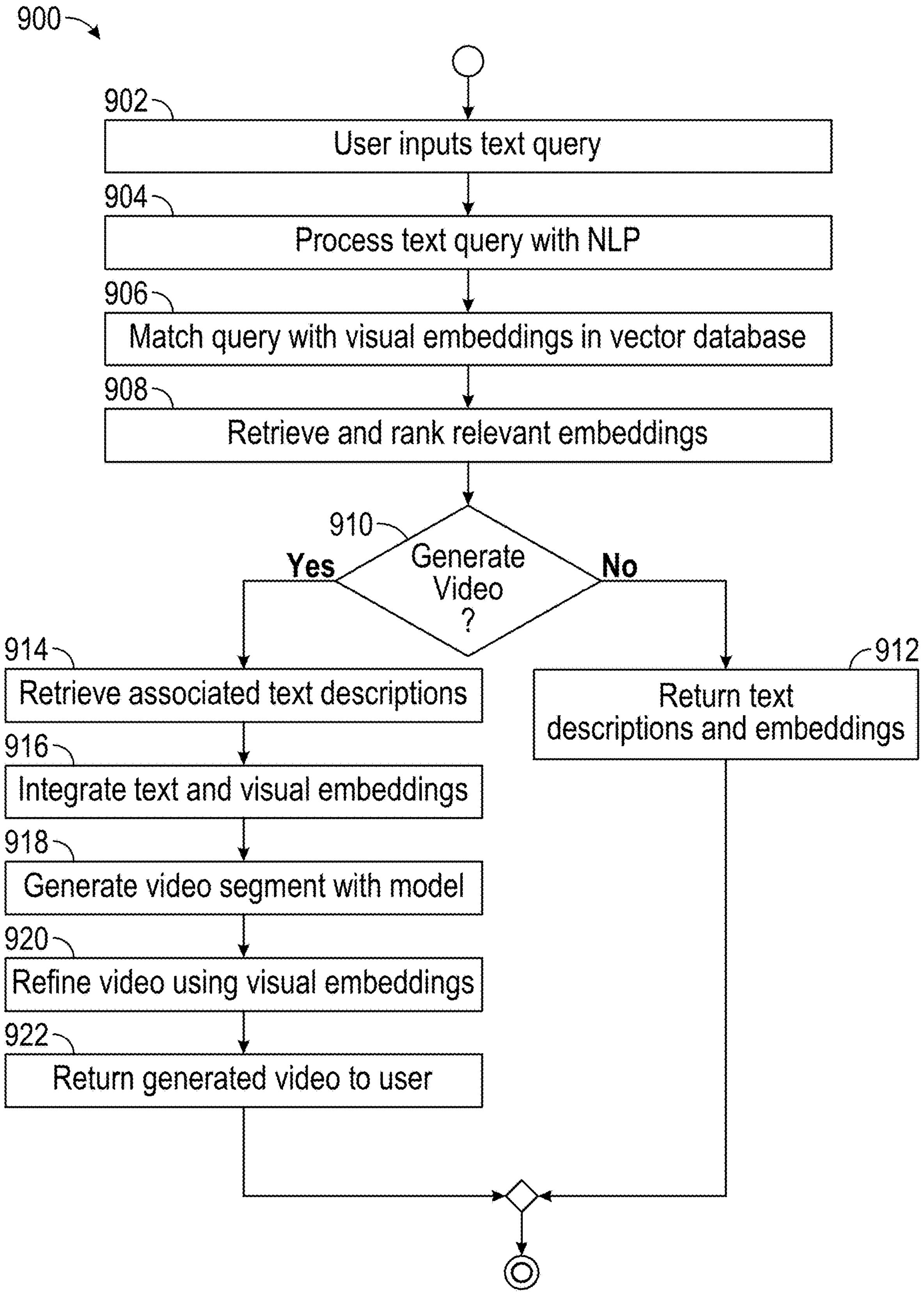
FIG. 9 depicts a flow diagram of video generation utilizing the vector database, in response to a search query (e.g., text query) input, in accordance with some embodiments of this disclosure.

FIG. 9 depicts a flow diagram of video generation utilizing the vector database, in response to a search query input (e.g., text query input), in accordance with some embodiments of this disclosure.

In some embodiments, at 902, the input/output circuitry (e.g., input/output circuitry 1112 of FIG. 11) receives a search query input (e.g., text query) from a user device. In some embodiments, the search query input is a description of the desired content, a keyword, a phrase, a question, an image, or a video. For example, the input/output circuitry of a tablet 162 may receive the text query, "What happened to my package?" 164, input via the user interface of the tablet.

In some embodiments, at 904, the control circuitry (e.g., control circuitry 1111 of FIG. 11) processes the search query using a Natural Language Processor (NLP), identifying key elements of the search query that correspond to objects, actions, and contexts. For example, the NLP may parse the search query to isolate and identify key elements. The key elements may be "package", and additional elements, such as the possessive element "my", which implies that the package may, for example, be related to the account owner of the tablet or the user profile of the running application.

In some embodiments, at 906, the search query matches the identified key elements with textual descriptions and/or feature embedding(s) in the vector database. For example, "my package" may match the textual description and/or feature embedding data structure in the vector database associated with the broken box 138 (e.g., because it was thrown from truck 140). In some approaches, the control circuitry uses methods like nearest-neighbor search or semantic search to perform the matching. For example, the control circuitry may match the word "package" in the search query with the feature embedding and/or textual description that is associated with the broken package 138. When using these methods, the control circuitry may prioritize embedding(s) and/or textual descriptions that closely match the query while considering context (e.g., time stamps or scene identifiers), to ensure relevance. For example, the search query may be "what happened to my package that was delivered at 2 μm yesterday?", the control circuitry may identify feature embeddings and/or textual descriptions recorded yesterday at 2 μm or later. In some approaches, the control circuitry uses a more sophisticated semantic search, where the control circuitry retrieves embedding(s) and/or textual descriptions based on the semantic similarity of the embedding(s) and/or textual descriptions to the search query. Using this approach, the control circuitry may be enabled to return results that align with the intent behind the search query, even if the system does not find exact matches. For example, in response to a search query inquiring about a blue car that was parked in a parking lot on a specific day, the control circuitry may determine that the search query intended to ask about the turquoise car that was parked in the parking lot on that day because there was no blue car parked in the parking lot that day.

In some embodiments, at 908, the control circuitry retrieves and ranks the embedding(s) and/or textual descriptions based on their relevance to the query. In some approaches, the ranking is based on a relevancy level relative to a relevancy threshold between the search query and the embedding(s) and/or textual descriptions, where closer relevancy corresponds to a higher level. For example, a relevancy level may be on a scale from 0.00 to 100.00, where feature embeddings and/or textual descriptions with relevancy levels approaching 100.00 are approaching a highest possible relevancy with respect to the search query. In some approaches, the control circuitry uses a multi-criteria ranking system that considers factors in addition to a relevancy level, such as the frequency of the feature in the video, the contextual importance of the embedding and/or textual descriptions, and the user interaction history. In this way, a multi-criteria ranking process may ensure that the embeddings and/or textual descriptions selected for video generation are contextually relevant.

In some embodiments, at 910, the control circuitry determines whether the response to the search query will include generating and delivering a video. For example, the control circuitry of the tablet 162 of FIG. 1A may receive on its user interface a checkbox that indicates to generate a video response to the search query "What happened to my package?". In some embodiments, the control circuitry will first respond to search query via a textual response and then determine whether to generate a video in response to the search query. In some embodiments, the control circuitry determines the response will be to refrain from generating and delivering a video. In these cases, at 912, the input/output circuitry returns textual descriptions back to the user device. In some embodiments, information contained in the relevant embeddings (e.g., categorical information) may be returned to the user device. For example, the user interface may offer a check box indicating to the control circuitry only to respond with a textual answer. The control circuitry may then generate the response "A truck arrived at 2 μm. A package was aggressively thrown from the truck and broke open upon impact with the ground. The truck swiftly fled the scene.".

In some embodiments, at 910, the control circuitry determines that the response to the search query will include generating and delivering a video. The video generation process may be a multi-stage process that utilizes advanced generative models. In some embodiments, at 914, the control circuitry retrieves associated text descriptions from the vector database. In some embodiments, the control circuitry, at 916, integrates the associated text descriptions and feature embeddings (e.g., visual embeddings) as an input to the advanced generative models.

In some embodiments, at 918, the control circuitry may generate video segments using advanced generative models designed to synthesize video content from textual descriptions and feature embeddings. For example, the advanced generative models may be Sora, Kling, any other generative model, or any combination thereof. In some embodiments, these models use neural networks (e.g., Generative Adversarial Networks (GANs) or Variational Autoencoders (VAEs) to generate realistic video that align with the search query input. In some approaches, the models first generate, based on the text description, a rough sequence of video segments that are to be refined in a following refinement step using feature embedding(s) in the vector database. In some embodiments, the control circuitry employs a transformer-based model (e.g., Kling) to generate video content, utilizing attention mechanisms to integrate information from both the text descriptions and feature embeddings.

In some embodiments, at 920, the control circuitry uses models that refine generated video segments from step 918, with embedding(s) retrieved from the vector database. For example, a generative model (e.g., Sora) may first generate a rough sequence of video frames based on the text and then use feature embedding(s) retrieved from the vector database to refine (e.g., via a conditioning network) the video frames so that key visual are accurately represented.

FIG. 10 depicts an illustrative user equipment 1000 and 1001, in accordance with some embodiments of this disclosure. For example, user equipment 1000 may be a smartphone device or tablet equipped with audio output equipment 1014, visual display 1012, user input interface 1010, memory storage 1008, processing circuitry 1006, control circuitry 1004, input/output (I/O) path 1002, camera 1019, and microphone 1016. In some embodiments, user equipment 1001 may be a user television equipment system or device. User equipment 1001 may include set-top box 1015. Set-top box 1015 may be communicatively connected to microphone 1016, audio output equipment 1014 (e.g., speaker or headphones), and display 1012. In some embodiments, microphone 1016 may receive audio corresponding to a voice of a user and/or ambient audio data. In some embodiments, display 1012 may be a television display or a computer display. In some embodiments, set-top box 1015 may be communicatively connected to user input interface 1010. In some embodiments, user input interface 1010 may be a remote-control device. Set-top box 1015 may include one or more circuit boards. In some embodiments, the circuit boards may include control circuitry 1004, processing circuitry 1006, and storage 1008 (e.g., RAM, ROM, hard disk, removable disk, etc.). In some embodiments, the circuit boards may include an input/output path 1002.

Each one of user equipment 1000 and user equipment 1001 may receive content and data via input/output (I/O) path 1002. I/O path 1002 may provide supplemental content (e.g., audio or visual media) and data to control circuitry 1004, which may comprise processing circuitry 1006 and storage 1008. Control circuitry 1004 may be used to send and receive commands, requests, and other suitable data using I/O path 1002, which may comprise I/O circuitry. While set-top box 1015 is shown in FIG. 10 for illustration, any suitable computing device having processing circuitry, control circuitry, and storage may be used in accordance with the present disclosure. For example, set-top box 1015 may be replaced by, or complemented by, a personal computer (e.g., a notebook, a laptop, a desktop), a smartphone (e.g., user equipment 1000), an XR device, a tablet, a network-based server hosting a user-accessible client device, a non-user-owned device, any other suitable device, or any combination thereof.

Control circuitry 1004 may be based on any suitable control circuitry such as processing circuitry 1006. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1004 executes instructions for the system stored in memory (e.g., storage 1008). Specifically, control circuitry 1004 may be instructed by the system to perform the functions discussed above and below. In some implementations, processing or actions performed by control circuitry 1004 may be based on instructions received from the system.

In client/server-based embodiments, control circuitry 1004 may include communications circuitry suitable for communicating with a server or other networks or servers. The system may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.). For example, in FIG. 10, the instructions may be stored in storage 1008, and executed by control circuitry 1004 of a user equipment 1000.

In some embodiments, the application may be a client/server application where only the client application resides on user equipment 1000, and a server application resides on an external server (e.g., server 1104 and/or media content source 1102). For example, the application may be implemented partially as a client application on control circuitry 1004 of user equipment 1000 and partially on server 1104 as a server application running on control circuitry 1111. Server 1104 may be a part of a local area network with one or more of user equipment 1000, 1001 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1104 and/or an edge computing device), referred to as "the cloud." User equipment 1000 may be a cloud client that relies on the cloud computing capabilities from server 1104 to generate personalized supplemental content.

Control circuitry 1004 may include communications circuitry suitable for communicating with a server, edge computing systems and devices, a table or database server, or other networks or servers. The instructions for carrying out the above-mentioned functionality may be stored on a server (which is described in more detail in connection with FIG. 11). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 11). In addition, communications circuitry may include circuitry that enables peer-to-peer communication of user equipment, or communication of user equipment in locations remote from each other (described in more detail below).

Memory may be an electronic storage device provided as storage 1008 that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 1008 may be used to store various types of content described herein as well as application data described above. Nonvolatile memory may also be used (e.g., to launch a boot-up routine and other instructions). Cloud-based storage, described in relation to FIG. 10, may be used to supplement storage 1008 or instead of storage 1008. Non-transitory memory may store instructions that, when executed by control circuitry, I/O circuitry, any other suitable circuitry or combination thereof, executes functions of an application as described above.

Control circuitry 1004 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1004 may also include scaler circuitry for upconverting and downconverting content into the preferred output format of user equipment 1000. Control circuitry 1004 may also include digital-to-analog converter circuitry and analog-to-digital converter circuitry for converting between digital and analog signals. The tuning and encoding circuitry may be used by user equipment 1000 and 1001 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

Control circuitry 1004 may receive instruction from a user by way of user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of each one of user equipment 1000 and user equipment 1001. For example, display 1012 may be a touchscreen or touch-sensitive display. In such circumstances, user input interface 1010 may be integrated with or combined with display 1012. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1015.

Audio output equipment 1014 may be integrated with or combined with display 1012. Display 1012 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1012. Audio output equipment 1014 may be provided as integrated with other elements of each one of user equipment 1000 and user equipment 1001 or may be stand-alone units. An audio component of videos and other content displayed on display 1012 may be played through speakers (or headphones) of audio output equipment 1014. In some embodiments, audio may be distributed to a receiver (not shown), which processes and outputs the audio via speakers of audio output equipment 1014. In some embodiments, for example, control circuitry 1004 is configured to provide audio cues to a user, or other audio feedback to a user, using speakers of audio output equipment 1014. There may be a separate microphone 1016 or audio output equipment 1014 may include a microphone configured to receive audio input such as voice commands or speech. For example, a user may speak letters or words that are received by the microphone and converted to text by control circuitry 1004. In a further example, a user may voice commands that are received by a microphone and recognized by control circuitry 1004. Camera 1018 (e.g., surveillance camera 134 of FIGS. 1A and 1B) may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

The application may be implemented using any suitable architecture. For example, it may be a stand-alone application wholly implemented on each one of user equipment 1000 and user equipment 1001. In such an approach, instructions of the application may be stored locally (e.g., in storage 1008), and data for use by the application is downloaded on a periodic basis (e.g., from an out-of-band feed, from an internet resource, or using another suitable approach). Control circuitry 1004 may retrieve instructions of the application from storage 1008 and process the instructions to provide video conferencing functionality and generate any of the displays discussed herein. Based on the processed instructions, control circuitry 1004 may determine what action to perform when input is received from user input interface 1010. For example, movement of a cursor on a display up/down may be indicated by the processed instructions when user input interface 1010 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and nonvolatile computer memory or storage devices such as a hard disk, floppy disk, USB drive, DVD, CD, media card, register memory, processor cache, random access memory (RAM), etc.

Control circuitry 1004 may allow a user to provide user profile information or may automatically compile user profile information. For example, control circuitry 1004 may access and monitor network data, video data, audio data, processing data, content consumption data, and/or any other suitable data being accessed by a first user (e.g., user 140 of museum device 120). Control circuitry 1004 may obtain all or part of other user profiles that are related to a particular user (e.g., via social media networks), and/or obtain information about the user from other sources that control circuitry 1004 may access. As a result, a user may be provided with a unified experience across the user's different devices.

In some embodiments, the application (e.g., the data processing application) is a client/server-based application (e.g., running via server 132 of FIGS. 1A and 1B). Data for use by a thick or thin client implemented on each one of user equipment 1000 and user equipment 1001 may be retrieved on demand by issuing requests to a server remote to each one of user equipment 1000 and user equipment 1001. For example, the remote server may store the instructions for the application in a storage device. The remote server may process the stored instructions using circuitry (e.g., control circuitry 1004) and generate the displays discussed above and below. The user equipment may receive the displays generated by the remote server and may display the content of the displays locally on user equipment 1000. This way, the processing of the instructions is performed remotely by the server while the resulting displays (e.g., that may include text, a keyboard, or other visuals) are provided locally on user equipment 1000. User equipment 1000 may receive inputs from the user via user input interface 1010 and transmit those inputs to the remote server for processing and generating the corresponding displays. For example, user equipment 1000 may transmit a communication to the remote server indicating that an up/down button was selected via user input interface 1010. The remote server may process instructions in accordance with that input and generate a display of the application corresponding to the input (e.g., a display that moves a cursor up/down). The generated display is then transmitted to user equipment 1000 for presentation to the user.

In some embodiments, the application may be downloaded and interpreted or otherwise run by an interpreter or virtual machine (run by control circuitry 1004). In some embodiments, the application may be encoded in the ETV Binary Interchange Format (EBIF), received by control circuitry 1004 as part of a suitable feed, and interpreted by a user agent running on control circuitry 1004. For example, the application may be an EBIF application. In some embodiments, the application may be defined by a series of JAVA-based files that are received and run by a local virtual machine or other suitable middleware executed by control circuitry 1004. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

FIG. 11 depicts an illustrative user equipment system, in accordance with some embodiments of this disclosure. In some embodiments, user equipment 1106, 1107, 1108, 1110, 1115 may be coupled to communication network 1109. Communication network 1109 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1109) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the user equipment may be provided by one or more of these communications paths but are shown as a single path in FIG. 11 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 1109.

System 1100 may comprise media content source 1102, one or more servers 1104, and/or one or more edge computing devices. In some embodiments, the application may be executed at one or more of control circuitry 1111 of server 1104 (and/or control circuitry of user equipment 1106, 1107, 1108, 1110, 1115 and/or control circuitry of one or more edge computing devices). In some embodiments, the media content source and/or server 1104 may be configured to host or otherwise facilitate video communication sessions between user equipment 1106, 1107, 1108, 1110, 1115 and/or any other suitable user equipment, and/or host or otherwise be in communication (e.g., over communication network 1109) with one or more social network services.

In some embodiments, server 1104 may include control circuitry 1111 and storage 1114 (e.g., RAM, ROM, Hard Disk, Removable Disk, etc.). Storage 1114 may store one or more databases. Non-transitory memory may store instructions that, when executed by control circuitry, I/O circuitry, any other suitable circuitry or combination thereof, executes functions of an application as described above. Server 1104 may also include an I/O path 1112. In some embodiments, I/O path 1112 may be an I/O circuitry. I/O circuitry may be a NIC card, audio output device, mouse, keyboard card, any other suitable I/O circuitry device or combination thereof. I/O path 1112 may provide video conferencing data, device information, or other data, over a local area network (LAN) or wide area network (WAN), and/or other content and data to control circuitry 1111, which may include processing circuitry, and storage 1114. Control circuitry 1111 may be used to send and receive commands, requests, and other suitable data using I/O path 1112, which may comprise I/O circuitry. I/O path 1112 may connect control circuitry 1111 to one or more communications paths.

Control circuitry 1111 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1111 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1111 executes instructions for an emulation system application stored in memory (e.g., the storage 1114). Memory may be an electronic storage device provided as storage 1114 that is part of control circuitry 1111. Memory may store instruction to run the application.

Figure 12:
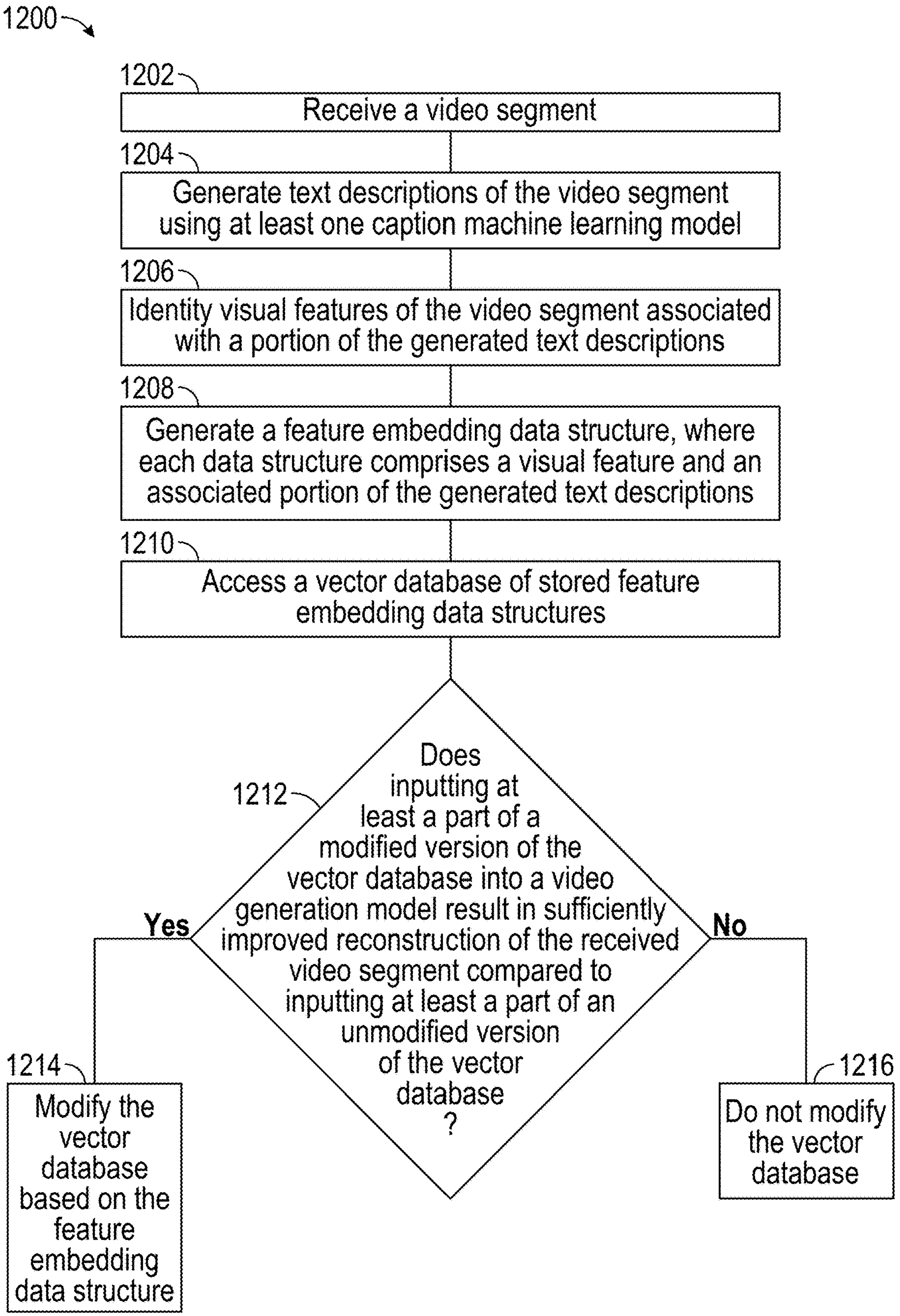
FIG. 12 depicts a flow diagram of a process for generating a feature embedding data structure from a video segment and determining whether to modify the vector database based on the feature embedding data structure, in accordance with some embodiments of this disclosure.

FIG. 12 depicts a flow diagram of a process for generating a feature embedding data structure from a video segment and determining whether to modify the vector database based on the feature embedding data structure, in accordance with some embodiments of this disclosure.

In some embodiments, the input/output circuitry receives a video segment 1202. For example, the input/output circuitry may receive the video segment captured on camera 134 of FIG. 1A.

In some embodiments, at 1204, the control circuitry (e.g., control circuitry 1111 of FIG. 11) may generate text descriptions of the video segment using at least one machine learning model. For example, the control circuitry (e.g., running via server 132 of FIGS. 1A and 1B) generates the textual description 106 of FIG. 1A that describes box 138 of FIG. 1A being thrown from truck 140 of FIG. 1A, box 138 breaking open, and truck 140 zooming away. The control circuitry (e.g., running the data processing application) may employ techniques for caption generation disclosed with respect to FIG. 6.

In some embodiments, at 1206, the control circuitry may identify visual features of the video segment associated with a portion of the generated text descriptions. For example, the control circuitry identifies visual features associated with box 138 of FIG. 1A being thrown from truck 140 of FIG. 1A. The control circuitry may determine whether inputting at least a part of a modified version of the vector database to a video generation model, wherein the modification is based on the identified visual features and/or generated text descriptions, results in sufficiently improved reconstruction of a received video segment, scene, object within a video segment or scene, or any combination thereof compared to inputting at least a part of an unmodified version of the vector database to the video generation model.

In some embodiments, at 1208, the control circuitry generates a feature embedding data structure, where each feature embedding comprises a visual feature and an associated portion of the generated text descriptions. For example, the control circuitry generates feature embedding 120 of FIG. 1A associated with box 138 of FIG. 1A being thrown and feature embedding 122 of FIG. 1A associated with the truck 140 of FIG. 1A driving away.

In some embodiments, at 1210, the control circuitry accesses a vector database of feature embedding data structures. The vector database may be populated based on analysis of at least one previously received video segment.

In some embodiments, at 1212, the control circuitry determines whether inputting into a video generation model at least a part of a modified version of the vector database, modified based on at least one generated feature embedding data structure, results in a sufficiently improved reconstruction of the received video segment, scene, object within a video segment or scene, or any combination thereof relative to a reconstruction made by inputting into a video generation model at least a part of an unmodified version of the vector database. If the control circuitry determines such an improvement, the control circuitry, in some embodiments, modifies the vector database at 1214, based on the at least one generated feature embedding data structures considered in the determination step 1212.

Figure 13:
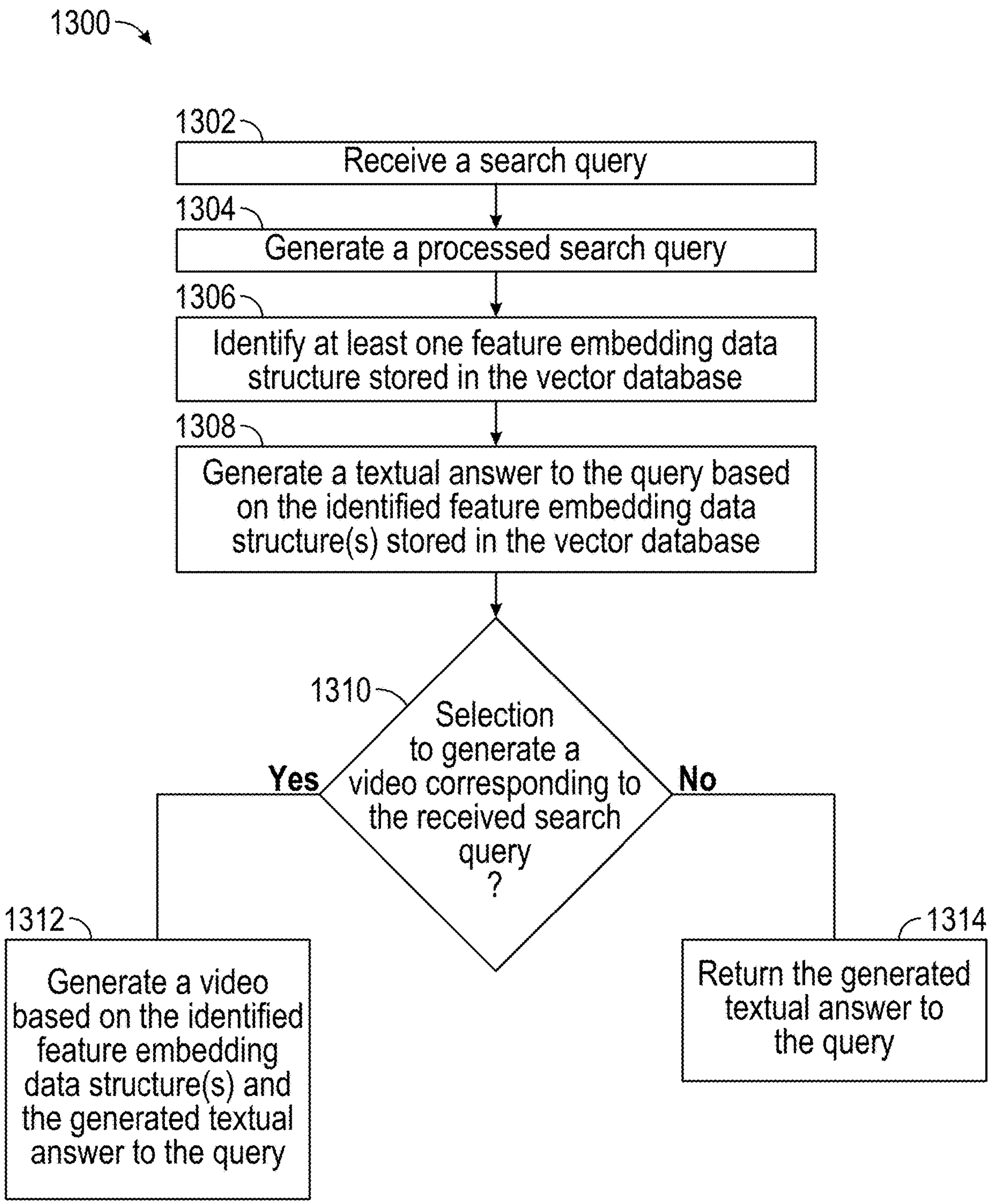
FIG. 13 depicts a flow diagram of a process for receiving a search query, processing the search query, identifying feature embedding(s) and/or textual descriptions from the vector database relevant to the search query, generating a textual response, and determining whether to generate a video based on the identified feature embedding(s), textual descriptions, generated textual response, or any combination thereof, in accordance with some embodiments of this disclosure.

FIG. 13 depicts a flow diagram of a process for receiving a search query, processing the search query, identifying feature embedding(s) and/or textual descriptions from the vector database relevant to the search query, generating a textual response, and determining whether to generate a video based on the identified feature embedding(s), textual descriptions, generated textual response, or any combination thereof, in accordance with some embodiments of this disclosure.

In some embodiments, the input/output circuitry (e.g., input/output circuitry 1112 of FIG. 11) receives a search query via a user interface at 1302. The control circuitry (e.g., control circuitry 1111 of FIG. 11) then generates a processed search query 1304, based at least in part on the received search query. For example, the input/output circuitry on a tablet 162 may receive a search query 164, "What happened to my package?". The search query may be processed using at least one NLP technique to understand the motivation of the search query and what an appropriate response may be. This may include determining that feature embedding data structures and/or textual descriptions related to the existence of "a package" (e.g., box 138), the quality of "a package" (e.g., box 138 being visibly broken), or other contexts (e.g., the truck 140 driving away), and the like, are relevant to the response to the search query.

In some embodiments, at 1306, the control circuitry identifies at least one feature embedding data structure in the vector database, based at least in part on the search query or the processed search query. For example, the control circuitry may identify at least one feature embedding data structure within the vector database, such as an image of the broken box 138 paired with a detailed textual description of the box and the context.

In some embodiments, at 1308, the control circuitry generates a textual answer to the query, based on the identified feature embedding data structure(s). For example, the control circuitry may generate the response "a truck arrived at 2 μm. Your package was aggressively thrown from the truck and broke open upon impact with the ground. The truck swiftly fled the scene."

In some embodiments, at 1310, the input/output circuitry receives a selection, via a user interface, that indicates whether to generate a video corresponding to the received search query. In some embodiments, the selection is to not generate a video, and, in response, the input/output circuitry returns the generated textual answer to the query at step 1314. For example, the control circuitry of the tablet 162 of FIG. 1A may receive on its user interface a checkbox that indicates to generate a video response to the search query "What happened to my package?" Alternatively, the user interface may offer a check box to indicate to the control circuitry only to respond with a textual answer. In some embodiments, the selection is to generate a video and, in response, the control circuitry, at 1312, generates and returns a video via the input/output circuitry. For example, the control circuitry may deliver or provide a generated video displaying a truck arriving at 2 μm, a box being thrown from the truck and the box breaking open on the ground. The video may also show the truck driving away from the scene. At 1312, the control circuitry may generate the video in accordance with methods disclosed in process 900 of FIG. 9.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a video segment captured by a camera of a user device;

generating textual descriptions that describe the received video segment using at least one machine learning model;

identifying a plurality of visual features in the video segment, wherein each of the identified plurality of visual features is associated with a respective portion of the generated textual descriptions;

generating a particular feature embedding data structure comprising: (a) a particular visual feature of the plurality of visual features; and (b) a particular portion of the generated textual descriptions associated with the particular visual feature;

accessing a vector database, wherein the vector database comprises a plurality of stored feature embedding data structures, wherein each of the plurality of stored feature embedding data structures is based on analysis of at least one previously received video segment;

determining that a first accuracy level of a first reconstruction of the received video segment exceeds, by at least a threshold amount, a second accuracy level of a second reconstruction of the received video segment, wherein:

the first reconstruction is based on inputting a modified version of the vector database to a video generation model, wherein the modified version of the vector database is modified based on the particular feature embedding data structure;

the second reconstruction is based on inputting an unmodified version of the vector database to the video generation model; and based at least in part on the determining, modifying the vector database based on the particular feature embedding data structure.

2. The method of claim 1, further comprising:

receiving a search query via a user interface;

generating, based at least in part on the received search query, a processed search query;

identifying, based at least in part on the processed search query, at least one feature embedding data structure stored in the vector database;

generating a textual answer to the query based on the identified at least one feature embedding data structure stored in the vector database;

receiving, via a user interface, a selection that indicates whether to generate a video corresponding to the received search query; and in response to the received selection indicating to generate the video corresponding to the received search query:

generating a video based on (a) the identified at least one feature embedding data structure stored in the vector database and (b) the generated textual answer to the query.

3. The method of claim 1, wherein the determining that the first accuracy level exceeds the second accuracy level by at least the threshold amount is based at least in part on:

calculating a first output value of a loss function based on inputting into the loss function a reconstruction of the received video segment that results from inputting at least a part of the modified version of the vector database to the video generation model, wherein the modification is based on the particular feature embedding data structure;

calculating a second output value of the loss function based on inputting into a loss function a reconstruction of the received video segment that results from inputting at least a part of the unmodified version of the vector database to the video generation model; and determining that the first output value of the loss function is less than the second output value of the loss function by at least a predetermined amount.

4. The method of claim 1, wherein the determining that the first accuracy level exceeds the second accuracy level by at least the threshold amount based at least in part on:

(a) displaying, on a device of the user, (i) a first reconstruction of the received video segment that results from inputting at least a part of the modified version of the vector database to the video generation model, wherein the modification is based on the particular feature embedding data structure, and (ii) a second reconstruction of the received video segment that results from inputting at least a part of the unmodified version of the vector database to the video generation model; and (b) receiving a selection via a user interface, wherein the selection indicates a preference for either the first reconstruction of the received video segment or the second reconstruction of the received video segment.

5. The method of claim 1, wherein the modifying the vector database based on the particular feature embedding data structure comprises at least one of:

replacing an existing feature embedding data structure stored in the vector database with the particular feature embedding data structure;

modifying an existing feature embedding data structure stored in the vector database based on the particular feature embedding data structure; or adding the particular feature embedding data structure to the vector database.

6. The method of claim 1, wherein the at least one machine learning model comprises at least one of a Recurrent Neural Network or a Transformer model.

7. The method of claim 1, wherein the generating textual descriptions comprises identifying a bounded region of interest within a frame of the received video segment, using at least one of a Region Proposal Network or a sliding window approach; and wherein the identifying the plurality of visual features in the video segment comprises extracting at least one of the plurality of visual features from the bounded region of interest using at least one of a Convolutional Neural Network or a Vision Transformer.

8. The method of claim 1, wherein the respective portion of the generated textual descriptions that is associated with each of the identified plurality of visual features is identified using at least one of a plurality of Natural Language Processing techniques, the plurality of Natural Language Processing techniques comprising Named Entity Recognition and keyword extraction.

9. The method of claim 1, wherein the respective portion of the generated textual descriptions that is associated with each of the identified plurality of visual features is identified using at least one of a plurality of vision-language models, wherein the plurality of vision-language models comprises a Contrastive Language-Image Pre-Training model.

10. The method of claim 1, wherein the generating the particular feature embedding further comprises using at least one of a plurality of visual machine learning models to generate the particular feature embedding, wherein the plurality of visual machine learning models comprises a residual neural network, a convolutional neural network, and a vision transformer.

11. The method of claim 1, wherein the vector database is based on analysis of video segments captured by a continuously operating surveillance camera.

12. The method of claim 1, wherein the modifying the vector database based on the particular feature embedding data structure comprises:

determining an importance level of the received video segment; and based at least in part on the determined importance level being above a predetermined importance threshold, at least one of:

storing the received video segment in the vector database; and wherein the generating textual descriptions that describe the received video segment is performed at an increased level of detail.

13. The method of claim 1, wherein the video segment captured by the camera of the user device is a surveillance video.

14. The method of claim 1, wherein at least one of the plurality of visual features is (a) a boxed region of the video segment or (b) generated via at least one neural network.

15. A system comprising:

a memory;

input/output circuitry configured to:

receive a video segment captured by a camera of a user device; and control circuitry configured to:

generate textual descriptions that describe the received video segment using at least one machine learning model;

identify a plurality of visual features in the video segment, wherein each of the identified plurality of visual features is associated with a respective portion of the generated textual descriptions;

generate a particular feature embedding data structure comprising: (a) a particular visual feature of the plurality of visual features; and (b) a particular portion of the generated textual descriptions associated with the particular visual feature;

access a vector database stored in the memory, wherein the vector database comprises a plurality of stored feature embedding data structures, wherein each of the plurality of stored feature embedding data structures is based on analysis of at least one previously received video segment;

determine that a first accuracy level of a first reconstruction of the received video segment exceeds, by at least a threshold amount, a second accuracy level of a second reconstruction of the received video segment, wherein:

the first reconstruction is based on inputting, via input/output circuitry, a modified version of the vector database to a video generation model, wherein the modified version of the vector database is modified based on the particular feature embedding data structure;

the second reconstruction is based on inputting, via input/output circuitry, an unmodified version of the vector database to the video generation model; and based at least in part on the determining, modify the vector database based on the particular feature embedding data structure.

16. The system of claim 15, wherein:

the input/output circuitry is further configured to:

receive a search query via a user interface; and the control circuitry is further configured to:

generate, based at least in part on the received search query, a processed search query;

identify, based at least in part on the processed search query, at least one feature embedding data structure stored in the vector database;

generate a textual answer to the query based on the identified at least one feature embedding data structure stored in the vector database;

receive, via a user interface, a selection that indicates whether to generate a video corresponding to the received search query; and in response to the received selection indicating to generate the video corresponding to the received search query:

generate a video based on (a) the identified at least one feature embedding data structure stored in the vector database and (b) the generated textual answer to the query.

17. The system of claim 15, wherein the control circuitry is further configured to determine that the first accuracy level exceeds the second accuracy level by at least the threshold amount by:

calculating a first output value of a loss function based on inputting, via input/output circuitry, into the loss function a reconstruction of the received video segment that results from inputting, via input/output circuitry, at least a part of the modified version of the vector database to the video generation model, wherein the modification is based on the particular feature embedding data structure;

calculating a second output value of the loss function based on inputting, via input/output circuitry, into a loss function a reconstruction of the received video segment that results from inputting, via input/output circuitry, at least a part of the unmodified version of the vector database to the video generation model; and determining that the first output value of the loss function is less than the second output value of the loss function by at least a predetermined amount.

18. The system of claim 15, wherein the control circuitry is further configured to determine that the first accuracy level exceeds the second accuracy level by at least the threshold amount by:

(a) displaying, on a device of the user, (i) a first reconstruction of the received video segment that results from inputting, via input/output circuitry, at least a part of the modified version of the vector database to the video generation model, wherein the modification is based on the particular feature embedding data structure, and (ii) a second reconstruction of the received video segment that results from inputting, via input/output circuitry, at least a part of the unmodified version of the vector database to the video generation model; and (b) receiving a selection via a user interface, wherein the selection indicates a preference for either the first reconstruction of the received video segment or the second reconstruction of the received video segment.

19. The system of claim 15, wherein the control circuitry is further configured to modify the vector database based on the particular feature embedding data structure by at least one of:

replacing an existing feature embedding data structure stored in the vector database with the particular feature embedding data structure;

modifying an existing feature embedding data structure stored in the vector database based on the particular feature embedding data structure; or adding the particular feature embedding data structure to the vector database.

20. The system of claim 15, wherein the at least one machine learning model comprises at least one of a Recurrent Neural Network or a Transformer model.

* * * * *